(12) United States Patent
Muratani

(10) Patent No.: US 7,982,965 B2
(45) Date of Patent: Jul. 19, 2011

(54) ZOOM LENS, OPTICAL APPARATUS EQUIPPED THEREWITH AND METHOD FOR MANUFACTURING THE ZOOM LENS

(75) Inventor: Mami Muratani, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/699,379

(22) Filed: Feb. 3, 2010

(65) Prior Publication Data
US 2010/0195214 A1   Aug. 5, 2010

(30) Foreign Application Priority Data
Feb. 4, 2009   (JP) .................................. 2009-023299

(51) Int. Cl.
*G02B 15/14* (2006.01)
(52) U.S. Cl. .......................... 359/682; 359/684; 359/691
(58) Field of Classification Search .................. 359/676, 359/677, 684, 691
See application file for complete search history.

(56) References Cited

U.S. PATENT DOCUMENTS
5,715,097 A * 2/1998 Shibayama et al. .......... 359/691
5,875,060 A   2/1999 Umeda FOREIGN PATENT DOCUMENTS
JP     8-234102 A   9/1996
JP  2000-002837 A   1/2000
* cited by examiner

*Primary Examiner* — Alicia M Harrington
(74) *Attorney, Agent, or Firm* — Miles & Stockbridge P.C.

(57) ABSTRACT

A zoom lens ZL installed in an electronic still camera 1 includes, in order from an object side, a first lens group G1 having negative refractive power, and a second lens group G2 having positive refractive power. A distance between the first lens group G1 and the second lens group G2 varies upon zooming from a wide-angle end state to a telephoto end state. The second lens group G2 has a front lens group G2F and a rear lens group G2R, and the front lens group G2F is moved along the optical axis upon focusing on a close object, thereby providing a compact zoom lens having excellent optical performance, an optical apparatus equipped with the zoom lens, and a method for manufacturing the zoom lens.

19 Claims, 15 Drawing Sheets

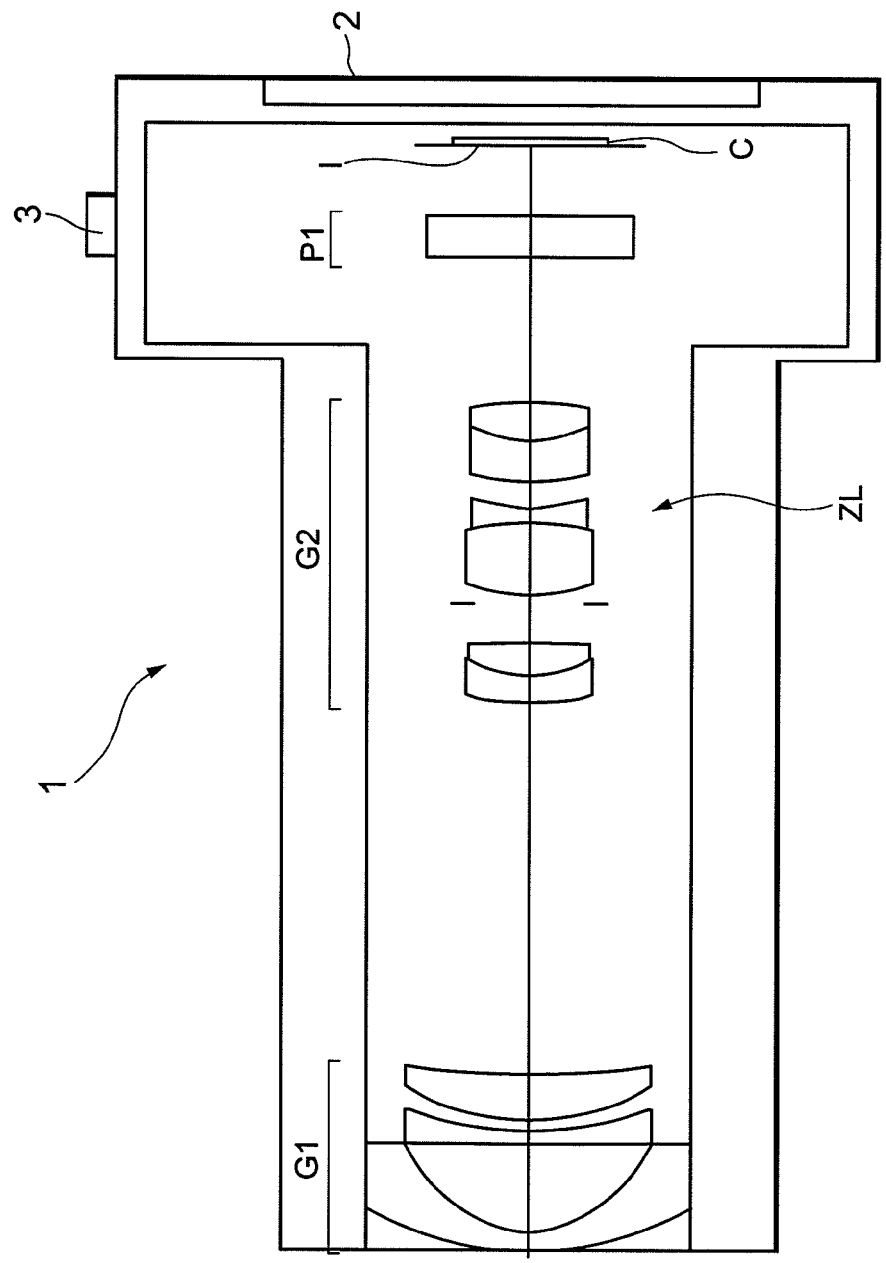

ZOOM LENS, OPTICAL APPARATUS EQUIPPED THEREWITH AND METHOD FOR MANUFACTURING THE ZOOM LENS

The disclosure of the following priority application is herein incorporated by reference:

Japanese Patent Application No. 2009-023299 filed on Feb. 4, 2009.

BACKGROUND OF THE INVENTION

1. Field of the Invention

The present invention relates to a zoom lens, an optical apparatus equipped with the zoom lens, and a method for manufacturing the zoom lens.

2. Related Background Art

There have been proposed negative-leading-lens type zoom lenses disclosed in such as Japanese Patent Application Laid-Open No. 8-234102. This kind of a retro-focus type two-lens-group zoom lens can be short in the total lens length and easy to obtain peripheral light amount, so that it is used as a wide zoom lens.

However, in the retro-focus type two-lens-group zoom lens, upon carrying out zooming by moving the first lens group to the object side, the total lens length becomes large upon focusing at a close object, so that the whole lens system becomes large.

SUMMARY OF THE INVENTION

The present invention is made in view of the above-described problems, and has an object to provide a compact zoom lens having excellent optical performance, an optical apparatus equipped with the zoom lens, and a method for manufacturing the zoom lens.

According to a first aspect of the present invention, there is provided a zoom lens comprising, in order from an object side: a first lens group having negative refractive power; and a second lens group having positive refractive power; a distance between the first lens group and the second lens group being variable upon zooming from a wide-angle end state to a telephoto end state, the second lens group including a front lens group and a rear lens group, the front lens group being movable along an optical axis upon focusing on a close object, and the following conditional expression (1) being satisfied:

$$0.20 < D2F/D2R < 0.65 \qquad (1)$$

where D2F denotes a distance along the optical axis between the most object side lens surface and the most image side lens surface of the front lens group, and D2R denotes a distance along the optical axis between the most object side lens surface and the most image side lens surface of the rear lens group.

In the first aspect of the present invention, it is preferable that the following conditional expression (2) is satisfied:

$$0.20 < IM \times Z/TLM < 1.20 \qquad (2)$$

where IM denotes an image height, Z denotes a zoom ratio, and TLM denotes the maximum value of the total lens length during zooming from the wide-angle end state to the telephoto end state upon focusing on infinity.

In the first aspect of the present invention, it is preferable that the following conditional expression (3) is satisfied:

$$0.70 < f2R/f2F < 1.00 \qquad (3)$$

where f2F denotes a focal length of the front lens group in the second lens group, and f2R denotes a focal length of the rear lens group in the second lens group.

In the first aspect of the present invention, it is preferable that the front lens group in the second lens group includes at least one cemented lens and at least one cemented surface of the cemented lens satisfies the following conditional expression (4):

$$0 < RF \qquad (4)$$

where RF denotes a radius of curvature of the cemented surface.

In the first aspect of the present invention, it is preferable that the front lens group in the second lens group includes at least one cemented lens, and the at least one cemented lens is constructed by a negative lens disposed to the object side cemented with a positive lens disposed to the image side.

In the first aspect of the present invention, it is preferable that the following conditional expression (5) is satisfied:

$$0.60 < D2/fw < 3.40 \qquad (5)$$

where D2 denotes a combined thickness of the second lens group, and fw denotes a focal length of the zoom lens in the wide-angle end state.

In the first aspect of the present invention, it is preferable that the following conditional expression (6) is satisfied:

$$1.20 < f2F/f2 < 3.00 \qquad (6)$$

where f2F denotes a focal length of the front lens group in the second lens group, and f2 denotes a focal length of the second lens group.

In the first aspect of the present invention, it is preferable that the front lens group in the second lens group is composed of two lenses or less.

In the first aspect of the present invention, it is preferable that all lens components composing the second lens group are positive.

In the first aspect of the present invention, it is preferable that the rear lens group in the second lens group includes two cemented lens components.

In the first aspect of the present invention, it is preferable that the rear lens group in the second lens group includes at least one cemented lens component, and the cemented lens component located to the most object side has a positive lens disposed to the most object side.

In the first aspect of the present invention, it is preferable that the first lens group includes, in order from the object, one or two single negative lenses and a single positive lens.

In the first aspect of the present invention, it is preferable that an aperture stop is disposed between the front lens group and the rear lens group in the second lens group.

In the first aspect of the present invention, it is preferable that at least one portion of the second lens group is movable in a direction including a component substantially perpendicular to the optical axis.

According to a second aspect of the present invention, there is provided an optical apparatus equipped with the zoom lens according to the first aspect.

According to a third aspect of the present invention, there is provided a method for manufacturing a zoom lens that includes a first lens group having negative refractive power and a second lens group having positive refractive power, the method comprising steps of: providing the first lens group and the second lens group such that a distance between the first lens group and the second lens group is variable upon zooming from a wide-angle end state to a telephoto end state; providing a front lens group and a rear lens group in the second lens group such that the front lens group is movable along the optical axis upon focusing on a close object; and satisfying the following conditional expression (1):

$$0.20 < D2F/D2R < 0.65 \quad (1)$$

where D2F denotes a distance along the optical axis between the most object side lens surface and the most image side lens surface of the front lens group, and D2R denotes a distance along the optical axis between the most object side lens surface and the most image side lens surface of the rear lens group.

In the third aspect of the present invention, the method preferably further comprises a step of: satisfying the following conditional expression (2):

$$0.20 < IM \times Z/TLM < 1.20 \quad (2)$$

where IM denotes an image height, Z denotes a zoom ratio, and TLM denotes the maximum value of the total lens length during zooming from the wide-angle end state to the telephoto end state upon focusing on infinity.

In the third aspect of the present invention, the method preferably further comprises a step of: satisfying the following conditional expression (3):

$$0.70 < f2R/f2F < 1.00 \quad (3)$$

where f2F denotes a focal length of the front lens group in the second lens group, and f2R denotes a focal length of the rear lens group in the second lens group.

In the third aspect of the present invention, the method preferably further comprises a step of: satisfying the following conditional expression (5):

$$0.60 < D2/fw < 3.40 \quad (5)$$

where D2 denotes a combined thickness of the second lens group, and fw denotes a focal length of the zoom lens in the wide-angle end state.

The present invention makes it possible to provide a compact zoom lens having excellent optical performance, an optical apparatus equipped with the zoom lens, and a method for manufacturing the zoom lens.

BRIEF DESCRIPTION OF THE DRAWINGS

FIGS. 2A, 2B and 2C are graphs showing various aberrations of the zoom lens according to Example 1 focusing on infinity, in which FIG. 2A shows various aberrations in a wide-angle end state, FIG. 2B shows various aberrations in an intermediate focal length state, and FIG. 2C shows various aberrations in a telephoto end state.

FIGS. 3A, 3B and 3C are graphs showing various aberrations of the zoom lens according to Example 1 focusing on a closest shooting distance, in which FIG. 3A shows various aberrations in the wide-angle end state, FIG. 3B shows various aberrations in the intermediate focal length state, and FIG. 3C shows various aberrations in the telephoto end state.

FIGS. 5A, 5B and 5C are graphs showing various aberrations of the zoom lens according to Example 2 focusing on infinity, in which FIG. 5A shows various aberrations in a wide-angle end state, FIG. 5B shows various aberrations in an intermediate focal length state, and FIG. 5C shows various aberrations in a telephoto end state.

FIGS. 6A, 6B and 6C are graphs showing various aberrations of the zoom lens according to Example 2 focusing on a closest shooting distance, in which FIG. 6A shows various aberrations in the wide-angle end state, FIG. 6B shows various aberrations in the intermediate focal length state, and FIG. 6C shows various aberrations in the telephoto end state.

FIGS. 8A, 8B and 8C are graphs showing various aberrations of the zoom lens according to Example 3 focusing on infinity, in which FIG. 8A shows various aberrations in a wide-angle end state, FIG. 8B shows various aberrations in an intermediate focal length state, and FIG. 8C shows various aberrations in a telephoto end state.

FIGS. 9A, 9B and 9C are graphs showing various aberrations of the zoom lens according to Example 3 focusing on a closest shooting distance, in which FIG. 9A shows various aberrations in the wide-angle end state, FIG. 9B shows various aberrations in the intermediate focal length state, and FIG. 9C shows various aberrations in the telephoto end state.

FIGS. 11A, 11B and 11C are graphs showing various aberrations of the zoom lens according to Example 4 focusing on infinity, in which FIG. 11A shows various aberrations in a wide-angle end state, FIG. 11B shows various aberrations in an intermediate focal length state, and FIG. 11C shows various aberrations in a telephoto end state.

FIGS. 12A, 12B and 12C are graphs showing various aberrations of the zoom lens according to Example 4 focusing on a closest shooting distance, in which FIG. 12A shows various aberrations in the wide-angle end state, FIG. 12B shows various aberrations in the intermediate focal length state, and FIG. 12C shows various aberrations in the telephoto end state.

FIGS. 13A and 13B are graphs showing an electronic still camera equipped with the zoom lens according to the present embodiment, in which FIG. 13A is a front view, and FIG. 13B is a rear view.

FIG. 14 is a sectional view along A-A line in FIG. 13A.

DESCRIPTION OF THE MOST PREFERRED EMBODIMENT

Figure 1:
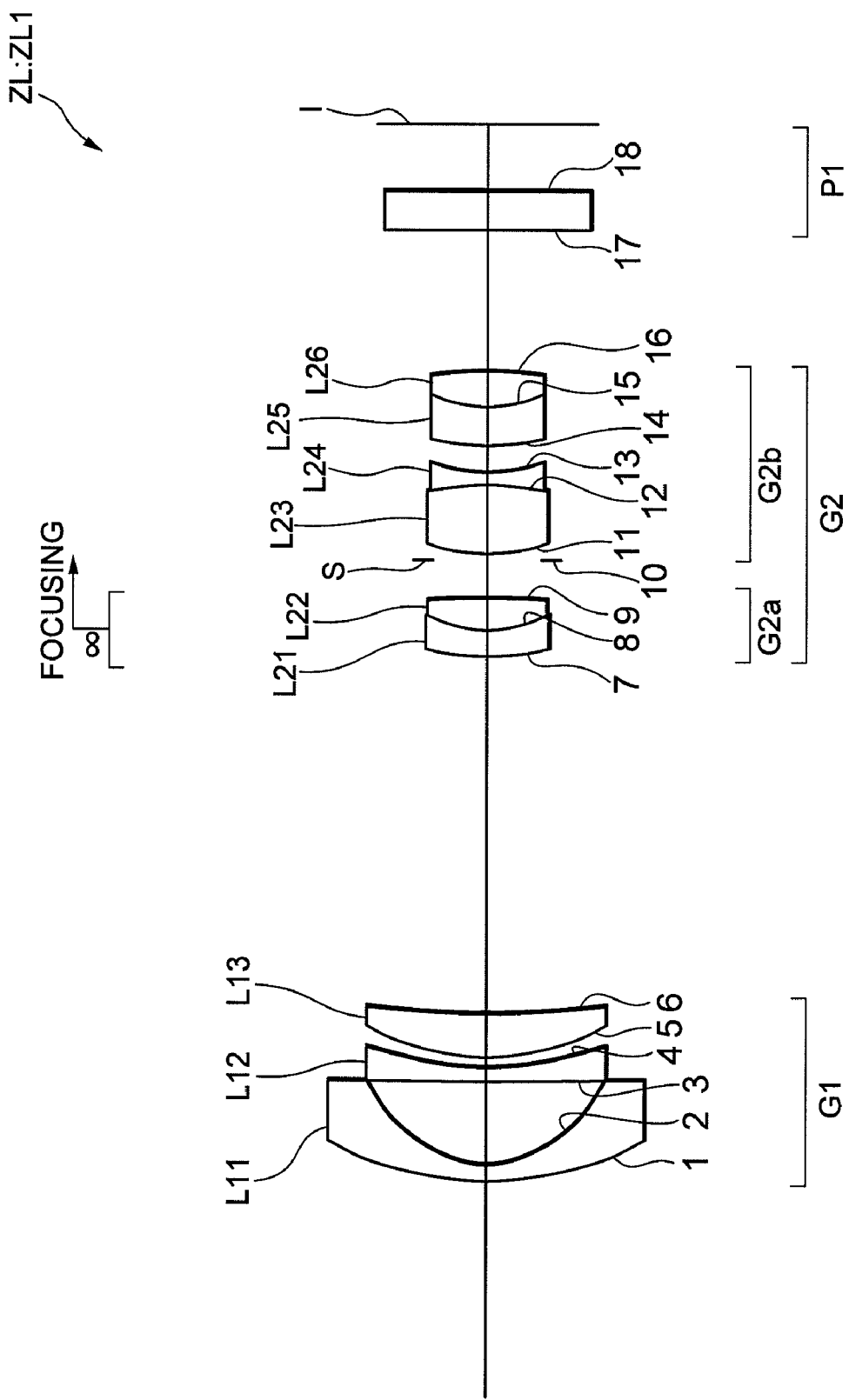
FIG. 1 is a sectional view showing a lens configuration of a zoom lens according to Example 1.

The most preferred embodiment of the present application is explained below with reference to accompanying drawings. In the present specification, "a wide-angle end state" and "a telephoto end state" shows a state focusing on infinity unless otherwise specified. As shown in FIG. 1, the present zoom lens ZL includes, in order from an object side, a first lens group G1 having negative refractive power, and a second lens group G2 having positive refractive power. Upon zooming from a wide-angle end state to a telephoto end state, a distance between the first lens group G1 and the second lens group G2 varies. The second lens group G2 includes a front lens group G2F and a rear lens group G2R, and focusing from infinity to a close object is carried out by moving the front lens group G2F along an optical axis.

The first lens group G1 is preferably composed of three lenses that are, in order from the object side, a negative lens having a concave surface facing an image side, a negative lens, and a positive lens. The second lens group G2 is preferably composed of, in order from the object side, a positive lens component, an aperture stop, and two positive cemented lenses disposed to the image side of the aperture stop.

In a retro-focus type two-lens-group zoom lens, when the first lens group G1 is used as a focusing lens group, there is an advantage that moving amount for focusing on a close object can be made constant in each focal length state. On the other hand, the first lens group G1, which has a large diameter, has to be moved in a direction extending the total lens length, so that there have been problems in view of lens barrel mechanism and aberrations.

However, in the zoom lens ZL according to the present embodiment, the second lens group G2 is divided into a front lens group G2F and a rear lens group G2R, and the smaller and lighter lens group, which is the front lens group G2F in the second lens group G2, is used as a focusing lens group in consideration of magnification and dimension of the front and rear lens groups G2F and G2R, so that the focusing lens group is made compact to lighten the burden to the configuration of the lens barrel. Since the lens groups front and rear of the focusing lens group does not move upon focusing, the total lens length does not change.

Then, conditions for configuring such a zoom lens ZL are explained. A zoom lens ZL according to the present embodiment preferably satisfies the following conditional expression (1):

$$0.20 < D2F/D2R < 0.65 \quad (1)$$

where D2F denotes a distance along the optical axis between the most object side lens surface and the most image side lens surface of the front lens group G2F, and D2R denotes a distance along the optical axis between the most object side lens surface and the most image side lens surface of the rear lens group G2R.

Conditional expression (1) defines the ratio of the thickness of the front lens group G2F to that of the rear lens group G2R in the second lens group G2.

When the ratio D2F/D2R is equal to or exceeds the upper limit of conditional expression (1), the front lens group, which carries out focusing, becomes too large, so that it becomes impossible to make the focusing lens group compact. Otherwise the rear lens group G2R is too small, so that it becomes difficult to correct off-axis aberrations such as distortion. Accordingly, it is undesirable. In order to secure the effect of the present embodiment, it is preferable to set the upper limit of conditional expression (1) to 0.55. In order to further secure the effect of the present embodiment, it is much preferable to set the upper limit of conditional expression (1) to 0.50. On the other hand, when the ratio D2F/D2R is equal to or falls below the lower limit of conditional expression (1), the ratio of the front lens group G2F in the second lens group G2 becomes too small, so that it becomes difficult to secure necessary magnification as a focusing lens group. Moreover, close range fluctuation in aberrations such as astigmatism becomes worse, and combined thickness becomes thinner, so that it is undesirable. In order to secure the effect of the present embodiment, it is preferable to set the lower limit of conditional expression (1) to 0.25. In order to further secure the effect of the present embodiment, it is much preferable to set the lower limit of conditional expression (1) to 0.30.

A zoom lens ZL according to the present embodiment preferably satisfies the following conditional expression (2):

$$0.20 < IM \times Z/TLM < 1.20 \quad (2)$$

where IM denotes an image height, Z denotes a zoom ratio, and TLM denotes the maximum value of the total lens length during zooming from the wide-angle end state to the telephoto end state upon focusing on infinity.

Conditional expression (2) is for balancing the zoom ratio and the total lens length of the zoom lens. When the value IM×Z/TLM is equal to or exceeds the upper limit of conditional expression (2), since the zoom lens uses an internal focusing system in which the focusing lens group is disposed between the first lens group G1 and the rear lens group G2R of the second lens group G2, sufficient moving amount for focusing cannot be secured without interfering with the other lens groups. Otherwise, the total lens length becomes too short resulting in worsening off-axis aberrations such as coma, so that it is undesirable. In order to secure the effect of the present embodiment, it is preferable to set the upper limit of conditional expression (2) to 1.00. In order to further secure the effect of the present embodiment, it is much preferable to set the upper limit of conditional expression (2) to 0.80. On the other hand, when the value IM×Z/TLM is equal to or falls below the lower limit of conditional expression (2), the zoom ratio becomes excessively small. Otherwise, the zoom lens becomes too large. When the first lens group G1 is made to be small so as not to make the zoom lens large, it becomes difficult to correct off-axis aberrations such as coma and peripheral light amount tends to become small, so that it is undesirable. In order to secure the effect of the present embodiment, it is preferable to set the lower limit of conditional expression (2) to 0.23. In order to further secure the effect of the present embodiment, it is much preferable to set the lower limit of conditional expression (2) to 0.26.

A zoom lens ZL according to the present embodiment preferably satisfies the following conditional expression (3):

$$0.70 < f2R/f2F < 1.00 \quad (3)$$

where f2F denotes a focal length of the front lens group G2F in the second lens group G2, and f2R denotes a focal length of the rear lens group G2R in the second lens group G2.

In a zoom lens ZL according to the present embodiment, an object point of the front lens group G2F, which is the focusing lens group, of the second lens group G2 is located near to an image point of the first lens group G1, so that an exit angle of the focusing lens group becomes afocal during zooming from the wide-angle end state to the telephoto end state, so that the focusing lens group acts as a converter of the rear lens group G2R disposed right behind thereof. Accordingly, an internal focusing system is configured by moving the front lens group G2F along the optical axis.

Conditional expression (3) defines the focal length ratio of the rear lens group G2R to the front lens group G2F in order to make the front lens group G2F in the second lens group G2 as a focusing lens group. When the ratio f2R/f2F is equal to or exceeds the upper limit of conditional expression (3), lateral magnification of the front lens group G2F in the second lens group G2 does not include afocal state during zooming from the wide-angle end state to the telephoto end state. As a result, there is no solution for imaging resulting in failing to be a focusing lens group, so that it is undesirable. In order to secure the effect of the present embodiment, it is preferable to set the upper limit of conditional expression (3) to 0.95. In order to further secure the effect of the present embodiment, it is much preferable to set the upper limit of conditional expression (3) to 0.935. On the other hand, when the ratio f2R/f2F is equal to or falls below the lower limit of conditional expression (3), the focal length of the front lens group G2F in the second lens group G2 becomes large, so that moving amount becomes too large resulting in interfering with the lens groups disposing front and behind thereof. Accordingly, shooting range cannot reach close range, so that sufficient function as a focusing lens group cannot be accomplished. Moreover, coma becomes worse, so that it is undesirable. In order to secure the effect of the present embodiment, it is preferable to set the lower limit of conditional expression (3) to 0.75. In order to further secure the effect of the present embodiment, it is much preferable to set the lower limit of conditional expression (3) to 0.80.

In a zoom lens ZL according to the present embodiment, the front lens group G2F in the second lens group G2 includes at least one cemented lens, and at least one cemented surface of the cemented lens preferably satisfies the following conditional expression (4):

$$0<RF \quad (4)$$

where RF denotes a radius of curvature of the cemented surface.

The front lens group G2F, which becomes the focusing lens group, of the second lens group G2 is preferably composed of fewer number of lenses in order to make it compact as much as possible. However, in order to keep spherical aberration and chromatic aberration in excellent condition in any shooting distance, the front lens group G2F preferably includes at least one cemented lens, and the at least one cemented lens is preferably constructed by a negative lens disposed to the object side cemented with a positive lens disposed to the image side.

When the focusing lens group G2F in the second lens group G2 is moved along the optical axis for focusing while passing paraxial ray through the front lens group G2F, curvature of field and astigmatism vary significantly. In order to suppress close range variation in aberrations as much as possible, it is preferable that the cemented surface has a concave surface facing the image side. In other words, it is preferable that the above-described conditional expression (4) is satisfied. Moreover, when a negative lens is disposed to the object side and a positive lens is disposed to the image side with keeping the state that the cemented surface has a convex surface facing the object side (0<RF), it becomes advantageous to correct spherical aberration and coma.

A zoom lens ZL according to the present embodiment preferably satisfies the following conditional expression (5):

$$0.60<D2/fw<3.40 \quad (5)$$

where D2 denotes a combined thickness of the second lens group G2, and fw denotes a focal length of the zoom lens in the wide-angle end state.

Conditional expression (5) defines the thickness of the second lens group G2 by the focal length of the zoom lens in the wide-angle end state. The second lens group G2 requires a certain extent of thickness in order to correct every possible aberrations from spherical aberration to off-axis aberrations. In the present embodiment, in order to be advantageous for compactness upon retracting the lens barrel, the combined thickness is shortened with correcting aberrations as much as possible. When the ratio D2/fw is equal to or exceeds the upper limit of conditional expression (5), the total thickness of the second lens group G2 becomes large, so that it becomes impossible to be compact. Upon trying to make the zoom lens compact with exceeding the upper limit of conditional expression (5), the burden shifts to the other lens groups, for example, the first lens group G1 becomes too small to correct aberrations and it becomes difficult to keep excellent aberrations such as distortion and astigmatism, so that it is undesirable. In order to secure the effect of the present embodiment, it is preferable to set the upper limit of conditional expression (5) to 2.80. In order to further secure the effect of the present embodiment, it is much preferable to set the upper limit of conditional expression (5) to 2.10. On the other hand, when the ratio D2/fw is equal to or falls below the lower limit of conditional expression (5), the total thickness of the second lens group G2 becomes too small, and a space between the front lens group G2F and the rear lens group G2R in the second lens group cannot be secured, so that when the front lens group G2F is moved for focusing on a close object as a focusing lens group, the front lens group G2F interferes with the rear lens group G2R. Otherwise, in order to accomplish a focal length in the wide-angle end state, power of the second lens group G2 becomes strong. Accordingly, it becomes difficult to correct aberrations such as spherical aberration, so that it is undesirable. In order to secure the effect of the present embodiment, it is preferable to set the lower limit of conditional expression (5) to 1.00. In order to further secure the effect of the present embodiment, it is much preferable to set the lower limit of conditional expression (5) to 1.40.

A zoom lens ZL according to the present embodiment preferably satisfies the following conditional expression (6):

$$1.20<f2F/f2<3.00 \quad (6)$$

where f2F denotes a focal length of the front lens group G2F in the second lens group G2, and f2 denotes a focal length of the second lens group G2.

Conditional expression (6) is for defining the focal length of the front lens group G2F and the focal length of the second lens group G2, which is the front lens group G2F and the rear lens group G2R. When the ratio f2F/f2 is equal to or exceeds the upper limit of conditional expression (6), the focal length of the front lens group G2F in the second lens group G2 becomes too large, and moving amount becomes large, so that when focusing on a close object, the front lens group G2F interferes with the rear lens group G2R. Moreover, the diameter of the lens becomes large, and it becomes impossible to make it wide-angle. Furthermore, coma becomes worse, so that it is undesirable. In order to secure the effect of the present embodiment, it is preferable to set the upper limit of conditional expression (6) to 2.85. In order to further secure the effect of the present embodiment, it is much preferable to set the upper limit of conditional expression (6) to 2.70. In order to further secure the effect of the present embodiment, it is far preferable to set the upper limit of conditional expression (6) to 2.30. In order to still further secure the effect of the present embodiment, it is most preferable to set the upper limit of conditional expression (6) to 2.20. On the other hand, when the ratio f2F/f2 is equal to or falls below the lower limit of conditional expression (6), the focal length of the front lens group G2F in the second lens group G2 becomes short, and since the image point of the first lens group G1 is necessary to coincide with the object point of the second lens group G2 in consideration of the moving amount and zooming trajectory, the focal length of the first lens group G1 also becomes short. Accordingly, it becomes difficult to correct distortion and astigmatism, so that it is undesirable. In order to secure the effect of the present embodiment, it is preferable to set the lower limit of conditional expression (6) to 1.40. In order to further secure the effect of the present embodiment, it is much preferable to set the lower limit of conditional expression (6) to 1.60. In order to further secure the effect of the present embodiment, it is far preferable to set the lower limit of conditional expression (6) to 1.70. In order to still further secure the effect of the present embodiment, it is most preferable to set the lower limit of conditional expression (6) to 1.80.

In a zoom lens ZL according to the present embodiment, the front lens group G2F in the second lens group G2 is preferably composed of two lenses or less. With this configuration, it becomes possible to make the focusing lens group compact and to prevent optical performance from deterioration caused by manufacturing errors upon processing and assembling. Although the present embodiment shows an example that the front lens group is composed of two lenses, it may be composed of a single lens.

In a zoom lens ZL according to the present embodiment, all lens component composing the second lens group G2 are preferably positive. With this configuration, it becomes possible to make refractive power of each lens small, so that generation of aberrations can be small with suppressing bad influence on optical performance caused by manufacturing error. Moreover, since the principal point locates nearer to the image plane, it contributes to making the total lens length compact.

In a zoom lens ZL according to the present embodiment, the rear lens group G2R in the second lens group G2 is preferably composed of cemented lenses in view of compactness of the lens barrel and manufacturing error. In that case, at least two cemented lenses are much preferably provided for the purpose of better correction of aberrations such that the object side cemented lens disposed near to the aperture stop S mainly corrects spherical aberration and coma, and the cemented lens disposed near to the image side mainly corrects off-axis aberrations such as curvature of field and distortion.

In a zoom lens ZL according to the present embodiment, the rear lens group G2R in the second lens group G2 preferably includes at least one cemented lens component, and the cemented lens component disposed to the most object side preferably has a positive lens disposed to the most object side. With this configuration, it becomes possible to enhance an effect of correcting aberrations with excellently correcting spherical aberration.

In a zoom lens ZL according to the present embodiment, the first lens group G1 preferably includes, in order from the object side, one or two negative single lenses and a positive single lens. With this configuration, it becomes possible to make the first lens group G1 compact. Since the first lens group G1 can be made compact in this manner, off-axis rays can be shifted to the optical axis, so that it becomes possible to excellently correct aberrations with suppressing generation of high order aberrations.

Figure 13A:
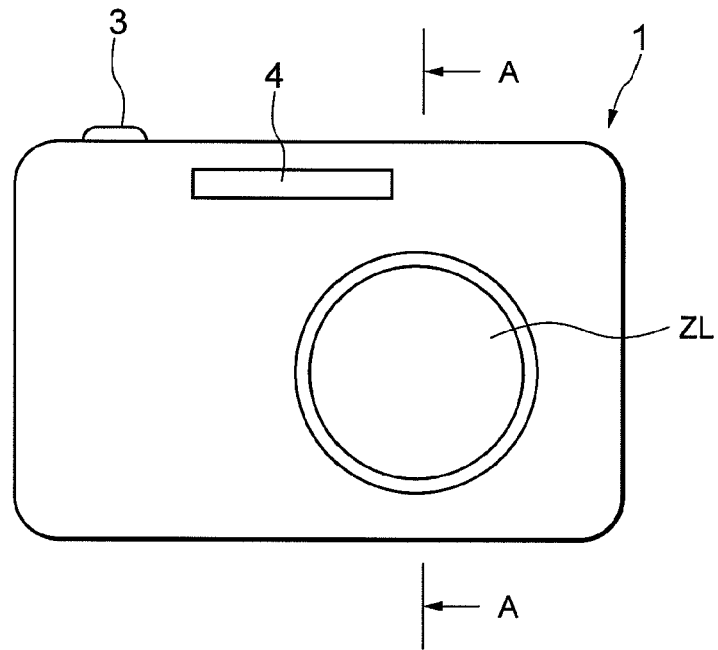
Figure 13B:
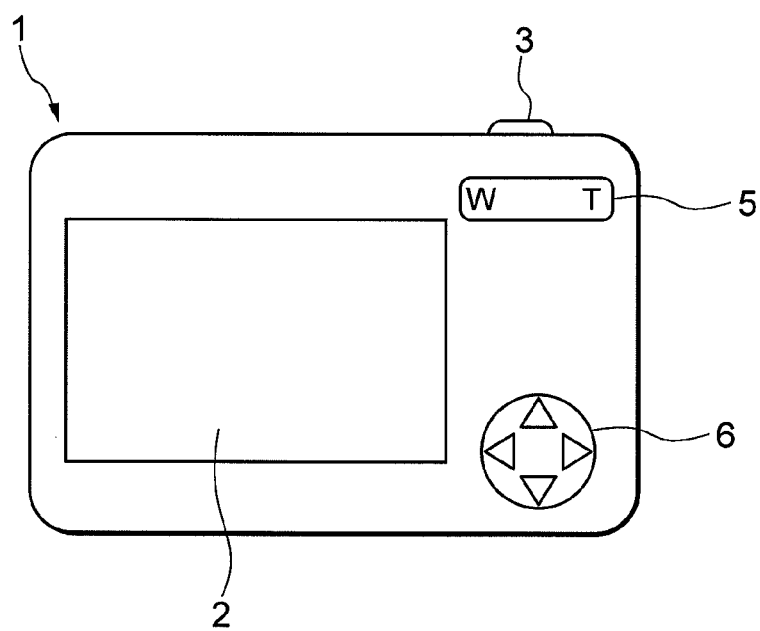

In FIGS. 13A, 13B and 14, construction of an electronic still camera 1 (hereinafter simply called as a camera) as an optical apparatus equipped with the above-described zoom lens ZL. In the camera 1, when a power switch button (not shown) is pressed, a shutter (not shown) of an image-taking lens (the zoom lens ZL) is opened, light from an object (not shown) is converged by the zoom lens ZL, and an image is formed on an imaging device C (such as a CCD, or CMOS) disposed on the image plane I. The object image formed on the imaging device C is displayed on a liquid crystal monitor 2 disposed backside of the camera 1. After fixing the composition of the object image with observing the liquid crystal monitor 2, a photographer depresses a release button 3 to take a picture of the object image by the imaging device C, and stores in a memory (not shown).

In the camera 1, the following members are disposed such as an auxiliary light emitter 4 that emits auxiliary light when the object is dark, a W-T button 5 that makes the zoom lens ZL carry out zooming between a wide-angle end state (W) and a telephoto end state (T), and a function button 6 that is used for setting various conditions of the camera 1. Although a compact type camera, in which a camera 1 and a zoom lens ZL are formed in a body, is shown in FIG. 14 as an example of an optical apparatus, the optical apparatus may be a single-lens-reflex camera, in which a lens barrel equipped with a zoom lens ZL is removably attached to a camera body.

Figure 15:
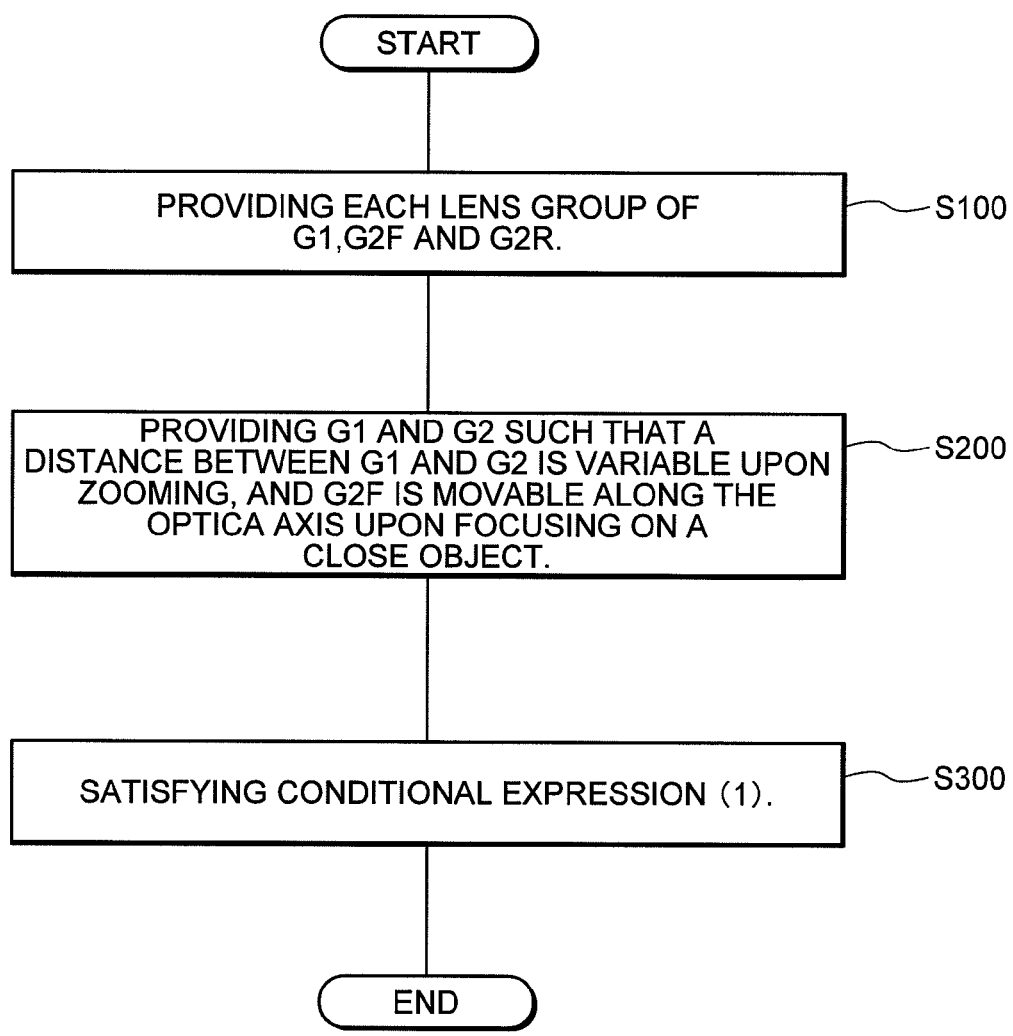
FIG. 15 is a flowchart schematically explaining a method for manufacturing the zoom lens according to the present embodiment.

Then, an outline of a method for manufacturing the zoom lens according to the present embodiment is explained below with reference to FIG. 15. At first, each lens is provided to prepare each lens group (Step S100). In particular, in the present embodiment, the first lens group G1 is provided by disposing, in order from an object side, a negative meniscus lens L11 having a convex surface facing the object side, a negative meniscus lens L12 having a convex surface facing the object side, and a positive meniscus lens L13 having a convex surface facing the object side. The front lens group G2F in the second lens group G2 is provided by a cemented lens constructed by, in order from the object side, a negative meniscus lens L21 having a convex surface facing the object side cemented with a double convex positive lens L22. The rear lens group G2R in the second lens group G2 is provided by disposing, in order from the object side, an aperture stop S, a cemented lens constructed by a double convex positive lens L23 cemented with a double concave negative lens L24, and a cemented lens constructed by a negative meniscus lens L25 having a concave surface facing the image side cemented with a double convex positive lens L26. The zoom lens is manufactured by disposing each lens group prepared as described above in the manner described in the following steps.

On this occasion, the first lens group G1 and the second lens group G2 are disposed such that a distance between the first lens group G1 and the second lens group G2 varies upon zooming from a wide-angle end state to a telephoto end state, and the front lens group G2F and the rear lens group G2R are disposed in the second lens group G2 such that the front lens group G2F is movable along the optical axis upon focusing on a close object (Step S200).

Moreover, on this occasion, the second lens group G2 is disposed with satisfying the following conditional expression (1) (Step S300):

$$0.20<D2F/D2R<0.65 \qquad (1)$$

where D2F denotes a distance along the optical axis between the most object side lens surface and the most image side lens surface of the front lens group G2F, and D2R denotes a distance along the optical axis between the most object side lens surface and the most image side lens surface of the rear lens group G2R.

Each Example according to the present application is explained with reference to accompanying drawings. FIG. 1 is a sectional view showing a lens configuration of a zoom lens ZL according to present embodiment.

A zoom lens ZL shown in FIG. 1 is composed of, in order from an object side, a first lens group G1 having negative refractive power, a second lens group G2 having positive refractive power. Upon zooming from a wide-angle end state to a telephoto end state, a distance between the first lens group G1 and the second lens group G2 varies. The second lens group G2 includes a front lens group G2F and a rear lens group G2R. The front lens group G2F is moved along the optical axis for focusing on a close object.

An aperture stop S may be disposed either in the front lens group G2F or in the rear lens group G2R of the second lens group G2. In each Example, a member P1 corresponding to a low-pass filter for blocking spatial frequency higher than the resolution limit of the solid-state imaging device such as a CCD disposed on the image plane I is disposed between the rear lens group G2R of the second lens group G2 and the image plane I.

In each Example, an aspherical surface is expressed by the following expression (a):

$$S(y)=(y^2/r)/\{1+(1-\kappa \times y^2/r^2)^{1/2}\}+A4 \times y^4+A6 \times y^6+A8 \times y^8+A10 \times y^{10} \qquad (a)$$

where y denotes a vertical height from the optical axis, S(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), κ denotes a conical coefficient, and An denotes an aspherical coefficient of n-th order. In the following Examples, "E-n" denotes "×10$^{-n}$". In each Example, the second order aspherical coefficient A2 is zero. In Table in each Example, an aspherical surface is denoted by a symbol "*" attached to the left side of the surface number.

Example 1

FIG. 1 is a sectional view showing a lens configuration of a zoom lens ZL1 according to Example 1. In the zoom lens ZL1 shown in FIG. 1, the first lens group G1 having negative refractive power as a whole is composed of, in order from an object side, a negative meniscus lens L11 having a convex surface facing the object side, a negative meniscus lens L12 having a convex surface facing the object side, and a positive meniscus lens L13 having a convex surface facing the object side. The front lens group G2F in the second lens group G2 having positive refractive power as a whole is composed of two lenses that are, in order from the object side, a cemented lens constructed by a negative meniscus lens L21 having a convex surface facing the object side cemented with a double convex positive lens L22. The rear lens group G2R in the second lens group G2 having positive refractive power as a whole is composed of, in order from the object side, an aperture stop S, and four lenses that are a cemented lens constructed by a double convex positive lens L23 cemented with a double concave negative lens L24, and a cemented lens constructed by a negative meniscus lens L25 having a concave surface facing the image side cemented with a double convex positive lens L26.

Various values associated with the zoom lens ZL1 according to Example 1 are listed in Table 1. In [Specifications], W denotes wide-angle end state, M denotes intermediate focal length state, T denotes telephoto end state, f denotes a focal length, Bf denotes a back focal length, FNO denotes an f-number, 2ω denotes an angle of view in degrees, and IM denotes an image height.

In [Lens Data], the left most column "i" shows the surface number counted in order from the object side, the second column "r" shows a radius of curvature of the surface, the third column "d" shows a distance to the next surface, the fourth column "vd" shows an Abbe number at d-line (wavelength λ=587.6 nm), and the fifth column "nd" shows a refractive index at d-line (wavelength λ=587.6 nm). In the fifth column "nd" the refractive index of the air nd=1.000000 is omitted. In the second column "r", r=0.0000 denotes a plane surface. In the third column "d", BF denotes a back focal length. In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

In [Lens Group Data], "I" denotes a start surface number of the lens group.

In [Aspherical Surface Data], conical coefficient κ, aspherical coefficients A4, A6, A8 and A10 with respect to each aspherical surface are shown.

In Example 1, the distance d1 along the optical axis between the first lens group G1 and the front lens group G2F in the second lens group G2, the distance d2 along the optical axis between the front lens group G2F and the rear lens group G2R in the second lens group G2, and the distance d3 along the optical axis between the rear lens group G2R and the filter P1 are varied upon zooming. In [Variable Distances], variable distances in each focal length state, wide-angle end state (W), intermediate focal length state (M), and telephoto end state (T) with respect to shooting ranges of infinity and closest shooting range (d0=300 mm) are shown, TL denotes a total lens length, ACTL denotes an air converted total lens length, and ACBf denotes an air converted back focal length. In [Values for Conditional Expressions], respective values for conditional expressions of the zoom lens ZL1 according to Example 1 are shown. D2F denotes a distance along the optical axis between the most object side lens surface and the most image side lens surface of the front lens group G2F, D2R denotes a distance along the optical axis between the most object side lens surface and the most image side lens surface of the rear lens group G2R, IM denotes an image height, Z denotes a zoom ratio, TLM denotes the maximum value of the total lens length from the wide-angle end state to the telephoto end state upon focusing on infinity, f2F denotes a focal length of the front lens group G2F in the second lens group G2, f2R denotes a focal length of the rear lens group G2R in the second lens group G2, RF denotes a radius of curvature of a cemented surface between the negative meniscus lens L21 and the double convex positive lens L22, D2 denotes a combined thickness of the second lens group G2, fw denotes a focal length of the zoom lens in the wide-angle end state, and f2 denotes a focal length of the second lens group G2. The explanation of symbols is the same as the following Examples.

TABLE 1

[Specifications]

|  | W | M | T |
|---|---|---|---|
| f = | 10.25 | 17.30 | 29.30 |
| Bf = | 5.4 | 5.4 | 5.4 |
| FNO = | 3.57 | 4.39 | 5.94 |
| 2ω= | 82.7° | 52.7° | 32.3° |
| IM = | 8.2 | 8.2 | 8.2 |

[Lens Data]

| i | r | d | vd | nd |
|---|---|---|---|---|
| *1 | 24.5733 | 1.3000 | 40.10 | 1.85135 |
| *2 | 8.6979 | 6.5000 | | |
| 3 | 350.4825 | 1.0000 | 44.78 | 1.74400 |
| 4 | 25.2910 | 0.8243 | | |
| 5 | 18.4974 | 3.4836 | 23.78 | 1.84666 |
| 6 | 65.7378 | (d1) | | |
| 7 | 19.5919 | 2.0000 | 42.72 | 1.83481 |
| 8 | 9.4188 | 2.5000 | 63.37 | 1.61800 |
| 9 | −153.2554 | (d2) | | |
| 10 | 0.0000 | 0.5000 | Aperture Stop S | |
| 11 | 14.0882 | 5.3759 | 52.64 | 1.74100 |
| 12 | −26.3968 | 1.0000 | 41.96 | 1.66755 |
| 13 | 11.1060 | 2.1116 | | |
| 14 | 25.3554 | 3.0000 | 40.76 | 1.88300 |
| 15 | 10.0615 | 2.8000 | 65.46 | 1.60300 |
| 16 | −30.9506 | (d3) | | |
| 17 | 0.0000 | 3.0700 | 64.10 | 1.51680 |
| 18 | 0.0000 | (Bf) | | |

TABLE 1-continued

[Lens Group Data]

| Group | I | focal length |
|---|---|---|
| G1 | 1 | −19.5583 |
| G2F | 7 | 41.0226 |
| G2R | 10 | 36.3741 |
| G2 | 7 | 20.9288 |

[Aspherical Surface Data]

Surface Number: 1

$\kappa = 1.9078$
$C4 = -1.14540E-05$
$C6 = -8.50660E-08$
$C8 = 0.00000E+00$
$C10 = 0.00000E+00$ Surface Number: 2

$\kappa = -0.1452$
$C4 = 1.47980E-04$
$C6 = 3.71930E-07$
$C8 = -5.34740E-1$
$C10 = 1.64370E-11$

[Variable Distances]

| | W | M | T |
|---|---|---|---|
| | | Infinity | |
| f | 10.25 | 17.30 | 29.30 |
| d1 | 27.7199 | 11.4459 | 1.7555 |
| d2 | 3.0896 | 3.0896 | 3.0896 |
| d3 | 10.9107 | 18.4547 | 31.2956 |
| TL | 82.5856 | 73.8557 | 77.0062 |
| Bf | 5.4000 | 5.4000 | 5.4000 |
| ACTL | 81.5396 | 72.8097 | 75.9602 |
| ACBf | 18.3347 | 25.8787 | 38.7196 |
| | | Closest Shooting Range | |
| β | −0.0316 | −0.0541 | −0.0923 |
| d1 | 29.1453 | 12.6423 | 3.0212 |
| d2 | 1.6642 | 1.8933 | 1.8240 |
| d3 | 10.9107 | 18.4547 | 31.2956 |
| TL | 82.5856 | 73.8557 | 77.0062 |
| Bf | 5.4000 | 5.4000 | 5.4000 |
| ACTL | 81.5396 | 72.8097 | 75.9602 |
| ACBf | 18.3347 | 25.8787 | 38.7196 |

[Values for Conditional Expressions]

(1) D2F/D2R = 0.3150
(2) IM × Z/TL = 0.2838
(3) f2R/f2F = 0.8867
(4) RF = 9.4188
(5) D2/fw = 2.1831
(6) f2F/f2 = 1.9601

Figure 2A:
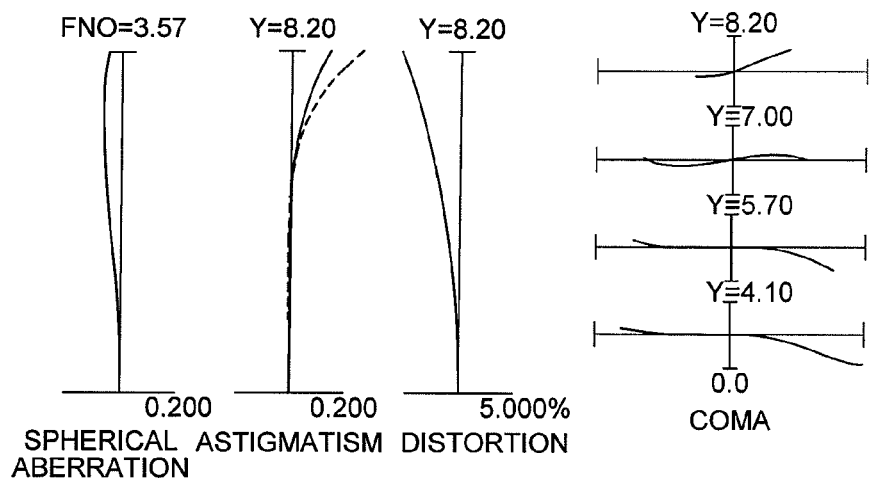
Figure 2B:
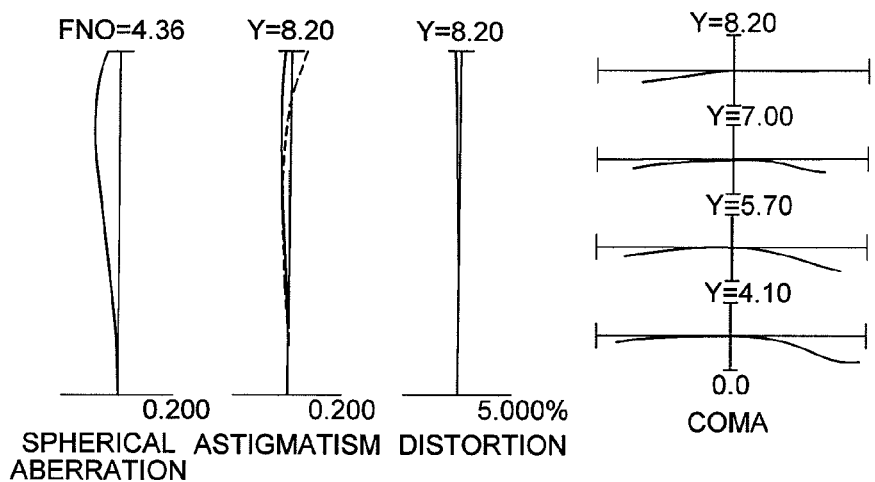
Figure 2C:
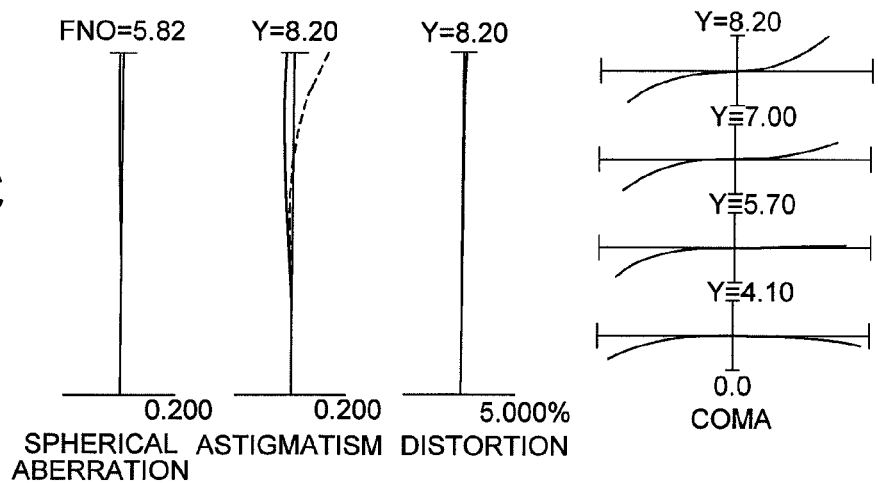
Figure 3A:
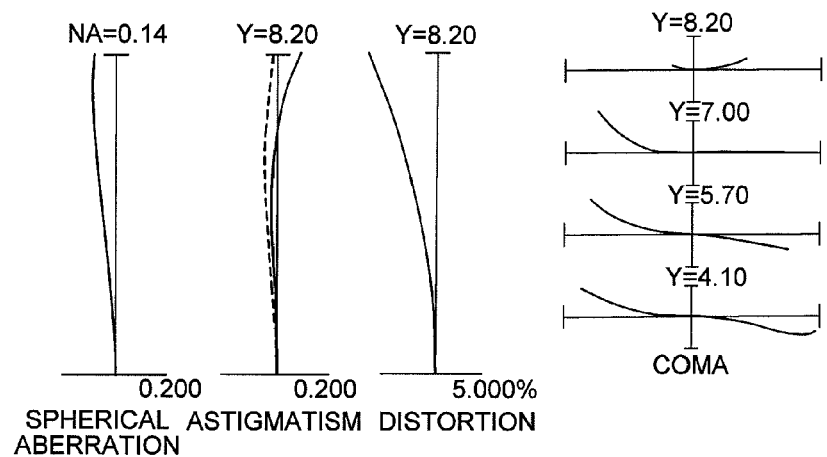
Figure 3B:
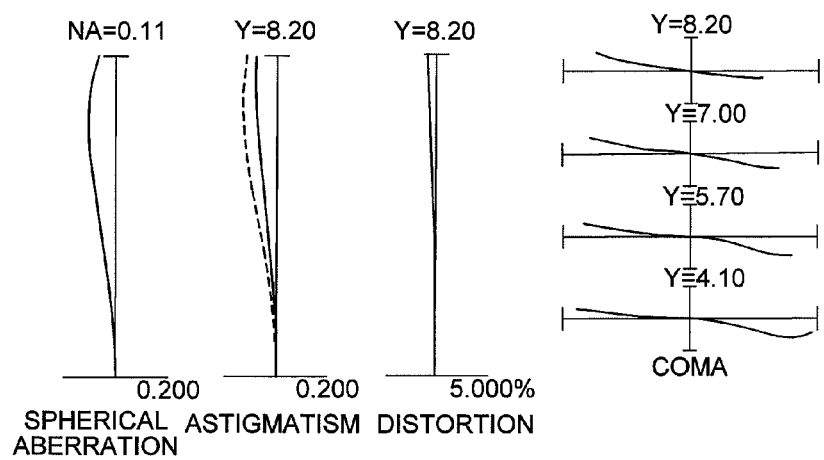
Figure 3C:
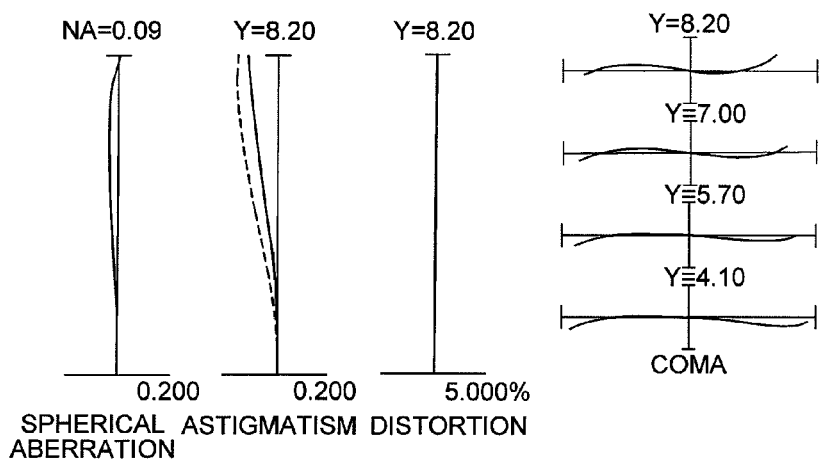

FIGS. 2A, 2B and 2C are graphs showing various aberrations of the zoom lens according to Example 1 at d-line (wavelength λ=587.6 nm) focusing on infinity, in which FIG. 2A shows various aberrations in a wide-angle end state, FIG. 2B shows various aberrations in an intermediate focal length state, and FIG. 2C shows various aberrations in a telephoto end state. FIGS. 3A, 3B and 3C are graphs showing various aberrations focusing on a closest shooting distance, in which FIG. 3A shows various aberrations in the wide-angle end state, FIG. 3B shows various aberrations in the intermediate focal length state, and FIG. 3C shows various aberrations in the telephoto end state. In respective graphs, FNO denotes an f-number, Y denotes an image height, and A denotes a half angle of view. In the graph showing astigmatism, a solid line indicates a sagittal image plane, and a broken line indicates a meridional image plane. The above-described explanations regarding various aberration graphs are the same as the other Examples. As is apparent from the respective graphs, the zoom lens according to Example 1 shows superb optical performance as a result of good corrections to various aberrations from the wide-angle end state through the telephoto end state.

Example 2

Figure 4:
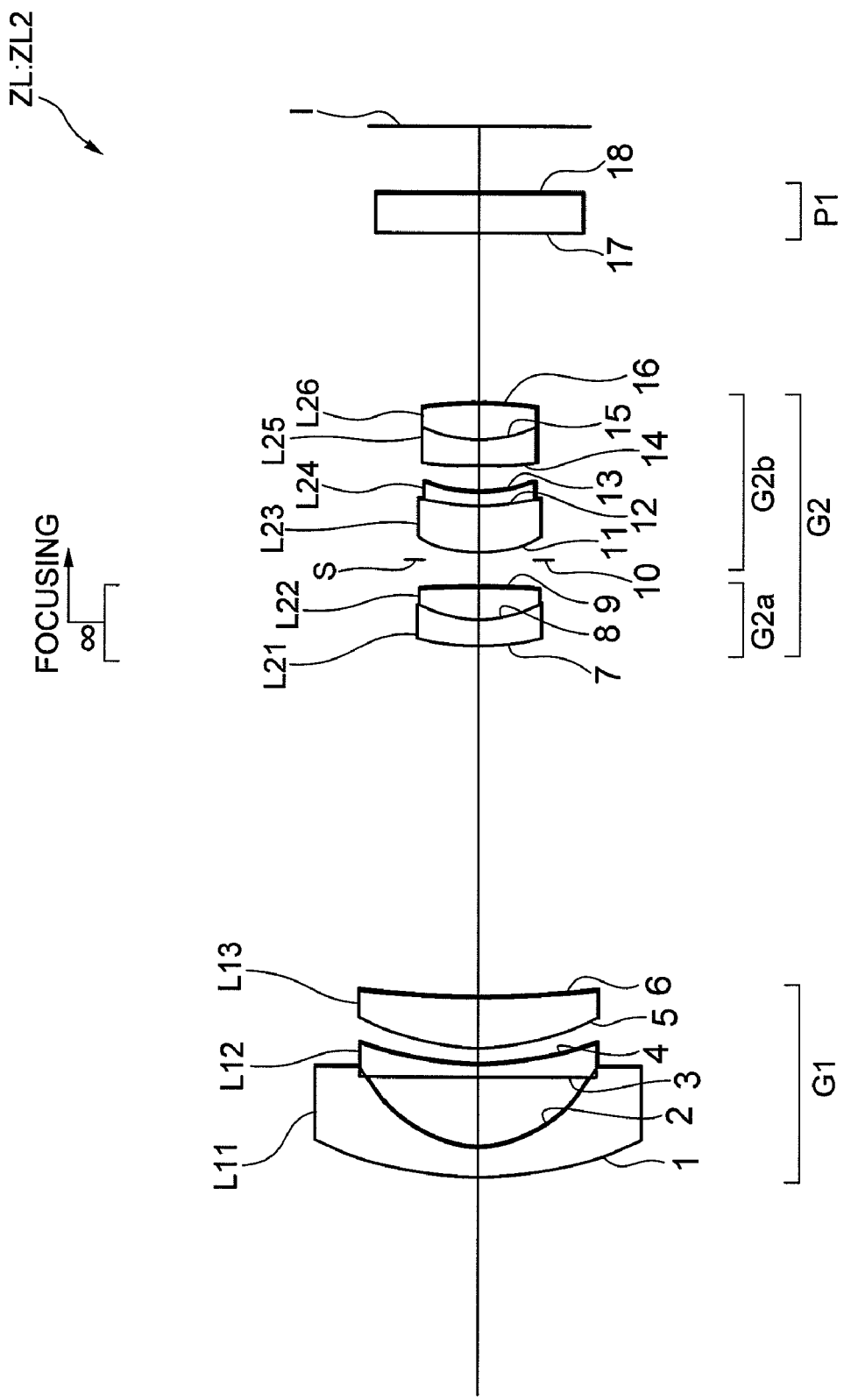
FIG. 4 is a sectional view showing a lens configuration of a zoom lens according to Example 2.

FIG. 4 is a sectional view showing a lens configuration of a zoom lens ZL2 according to Example 2. In the zoom lens ZL2 shown in FIG. 4, a first lens group G1 having negative refractive power as a whole is composed of three lenses that are, in order from an object, a negative meniscus lens L11 having a convex surface facing the object side, a negative meniscus lens L12 having a convex surface facing the object side, and a positive meniscus lens L13 having a convex surface facing the object side. A front lens group G2F in a second lens group G2 having positive refractive power as a whole is composed of two lenses that are a cemented lens constructed by, in order from the object side, a negative meniscus lens L21 having a convex surface facing the object side cemented with a double convex positive lens L22. A rear lens group G2R in the second lens group G2 having positive refractive power as a whole is composed of, in order from the object side, an aperture stop S, and four lenses that are a cemented lens constructed by a positive meniscus lens L23 having a convex surface facing the object side cemented with a negative meniscus lens L24 having a concave surface facing an image side, and a cemented lens constructed by a negative meniscus lens L25 having a concave surface facing the image side cemented with a double convex positive lens L26. Various values associated with the zoom lens ZL2 according to Example 2 are listed in Table 2.

In Example 2, the distance d1 along the optical axis between the first lens group G1 and the front lens group G2F in the second lens group G2, the distance d2 along the optical axis between the front lens group G2F and the rear lens group G2R in the second lens group G2, and the distance d3 along the optical axis between the rear lens group G2R and the filter P1 are varied upon zooming. In [Variable Distances], variable distances in each focal length state, wide-angle end state (W), intermediate focal length state (M), and telephoto end state (T) with respect to shooting ranges of infinity and closest shooting range (d0=300 mm) are shown.

TABLE 2

[Specifications]

| | W | M | T |
|---|---|---|---|
| f = | 10.25 | 17.30 | 29.30 |
| Bf = | 5.4 | 5.4 | 5.4 |
| FNO = | 3.57 | 4.39 | 5.94 |
| 2ω= | 82.7° | 52.7° | 32.3° |
| IM = | 8.2 | 8.2 | 8.2 |

[Lens Data]

| i | r | d | vd | nd |
|---|---|---|---|---|
| *1 | 28.6241 | 2.3000 | 40.10 | 1.85135 |
| *2 | 8.7000 | 5.5000 | | |
| 3 | 350.5666 | 1.0000 | 44.78 | 1.74400 |
| 4 | 26.2601 | 1.2515 | | |
| 5 | 19.1923 | 4.0078 | 23.78 | 1.84666 |
| 6 | 81.1513 | (d1) | | |
| 7 | 28.5021 | 2.0000 | 42.72 | 1.83481 |
| 8 | 10.2213 | 2.5000 | 63.37 | 1.61800 |

TABLE 2-continued

| | | | | |
|---|---|---|---|---|
| 9 | −39.1851 | (d2) | | |
| 10 | 0.0000 | 0.5000 | Aperture Stop S | |
| 11 | 11.3103 | 3.7408 | 52.64 | 1.74100 |
| 12 | 19.5341 | 1.0000 | 41.96 | 1.66755 |
| 13 | 11.6560 | 2.1116 | | |
| 14 | 70.0187 | 2.0295 | 40.76 | 1.88300 |
| 15 | 9.0005 | 2.8000 | 65.46 | 1.60300 |
| 16 | −18.3602 | (d3) | | |
| 17 | 0.0000 | 3.0700 | 64.10 | 1.51680 |
| 18 | 0.0000 | (Bf) | | |

[Lens Group Data]

| Group | I | focal length |
|---|---|---|
| G1 | 1 | −19.5947 |
| G2F | 7 | 42.0000 |
| G2R | 10 | 37.8596 |
| G2 | 7 | 20.9611 |

[Aspherical Surface Data]

Surface Number: 1

$\kappa = 1.4287$
$C4 = -3.51840E-06$
$C6 = -2.72930E-08$
$C8 = 0.00000E+00$
$C10 = 0.00000E+00$ Surface Number: 2

$\kappa = -0.1452$
$C4 = 1.47980E-04$
$C6 = 3.71930E-07$
$C8 = 1.93710E-09$
$C10 = 2.43060E-12$

[Variable Distances]

| | W | M | T |
|---|---|---|---|
| | Infinity | | |
| f | 10.25 | 17.30 | 29.30 |
| d1 | 27.5704 | 11.2409 | 1.5175 |
| d2 | 2.1349 | 2.1349 | 2.1349 |
| d3 | 13.4226 | 20.9643 | 33.8011 |
| TL | 82.3391 | 73.5513 | 76.6646 |
| Bf | 5.4000 | 5.4000 | 5.4000 |
| ACTL | 81.2931 | 72.5053 | 75.6186 |
| ACBf | 20.8466 | 28.3883 | 41.2251 |
| | Closest Shooting Range | | |
| β | −0.0316 | −0.0540 | −0.0921 |
| d1 | 29.0026 | 12.4405 | 2.7774 |
| d2 | 0.7028 | 0.9354 | 0.8750 |
| d3 | 13.4226 | 20.9643 | 33.8011 |
| TL | 82.3391 | 73.5513 | 76.6646 |
| Bf | 5.4000 | 5.4000 | 5.4000 |
| ACTL | 81.2931 | 72.5053 | 75.6186 |
| ACBf | 20.8466 | 28.3883 | 41.2251 |

[Values for Conditional Expressions]

(1) D2F/D2R = 0.3852
(2) IM × Z/TLM = 0.2847
(3) f2R/f2F = 0.9014
(4) RF = 10.2213
(5) D2/fw = 1.8358
(6) f2F/f2 = 2.0037

Figure 5A:
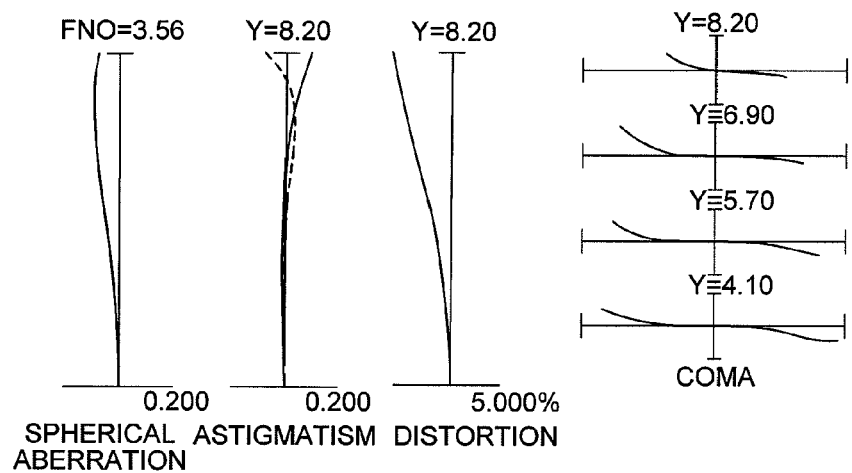
Figure 5B:
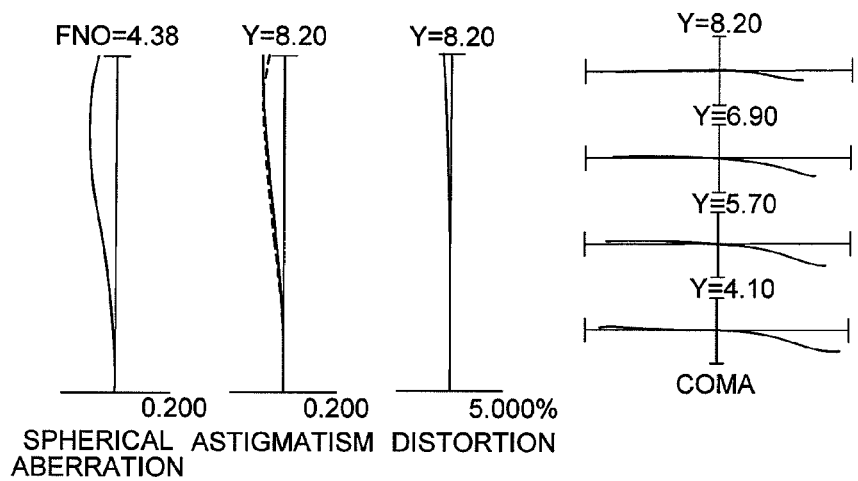
Figure 5C:
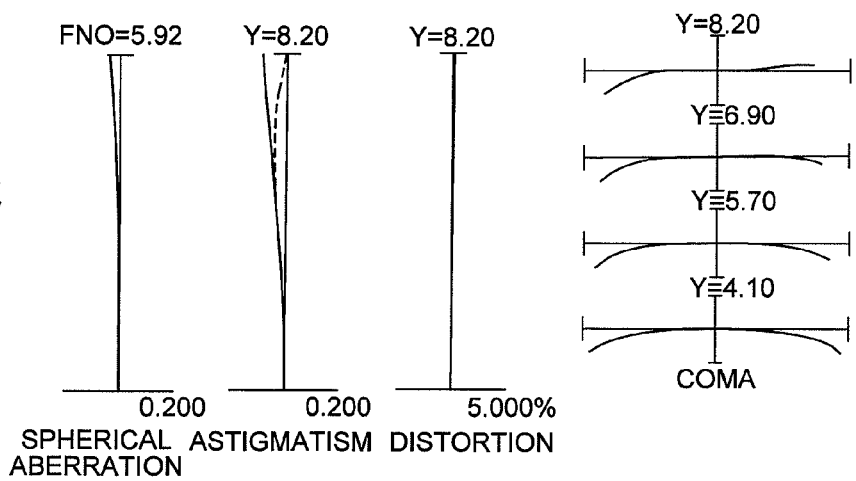
Figure 6A:
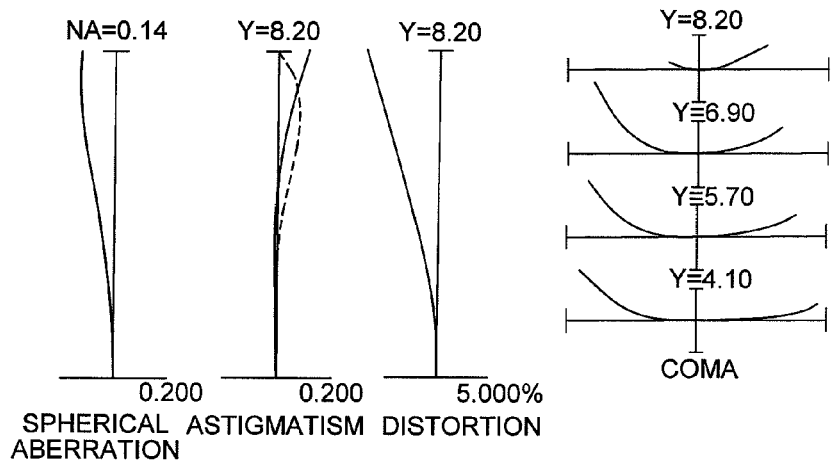
Figure 6B:
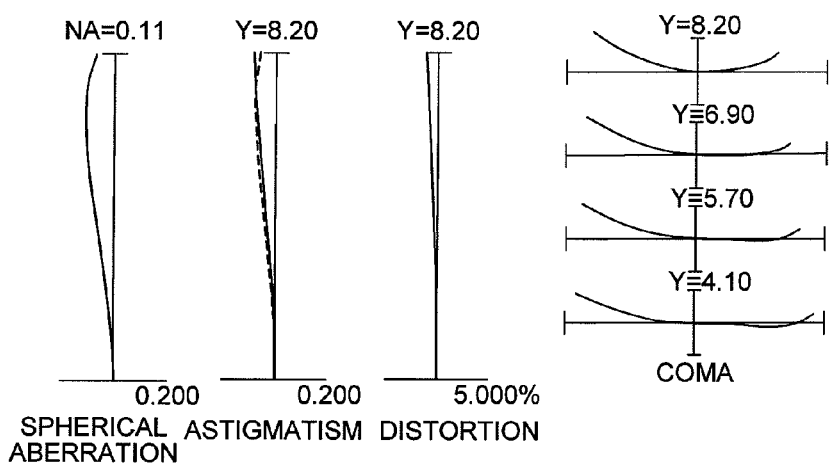
Figure 6C:
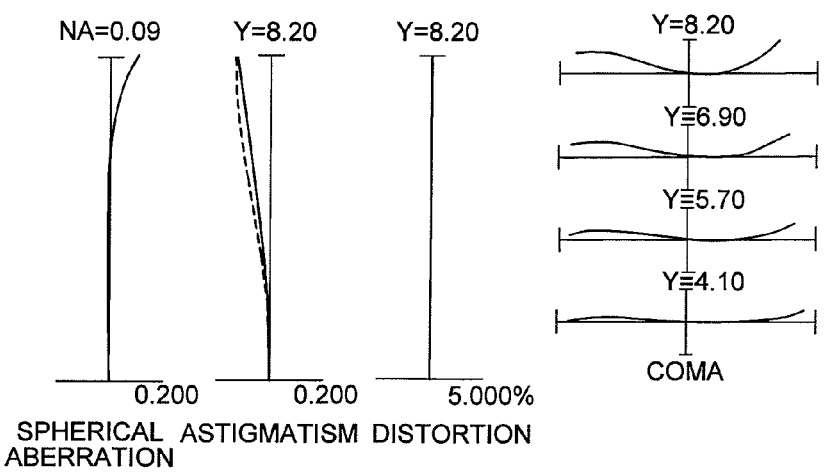

FIGS. 5A, 5B and 5C are graphs showing various aberrations of the zoom lens according to Example 2 at d-line (wavelength λ=587.6 nm) focusing on infinity, in which FIG. 5A shows various aberrations in a wide-angle end state, FIG. 5B shows various aberrations in an intermediate focal length state, and FIG. 5C shows various aberrations in a telephoto end state. FIGS. 6A, 6B and 6C are graphs showing various aberrations focusing on a closest shooting distance, in which FIG. 6A shows various aberrations in the wide-angle end state, FIG. 6B shows various aberrations in the intermediate focal length state, and FIG. 6C shows various aberrations in the telephoto end state.

As is apparent from the respective graphs, the zoom lens according to Example 2 shows superb optical performance as a result of good corrections to various aberrations from the wide-angle end state through the telephoto end state.

Example 3

Figure 7:
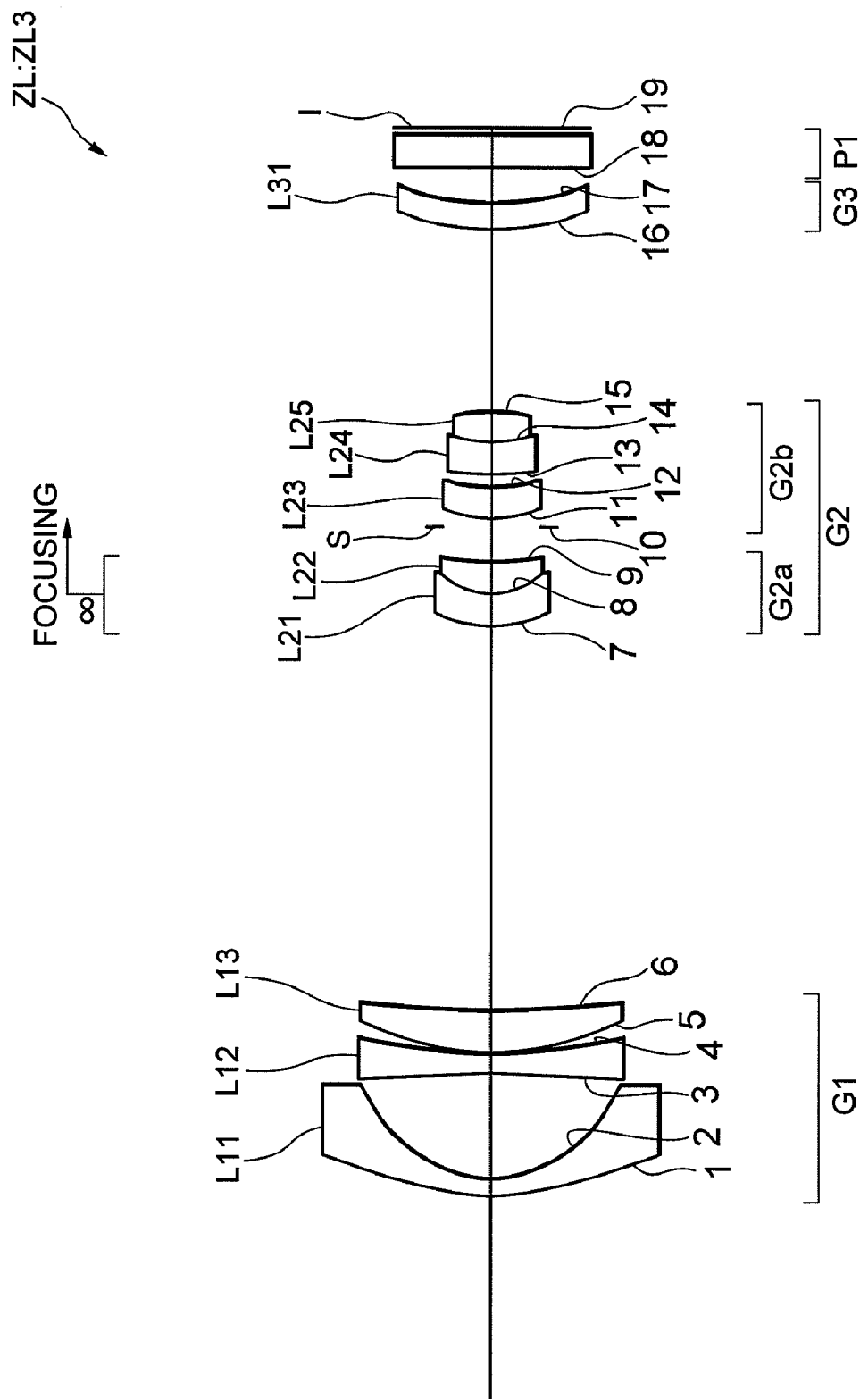
FIG. 7 is a sectional view showing a lens configuration of a zoom lens according to Example 3.

FIG. 7 is a sectional view showing a lens configuration of a zoom lens ZL3 according to Example 3.

The zoom lens ZL3 according to Example 3 shown in FIG. 7 is composed of, in order from an object, a first lens group G1, a second lens group G2, and a third lens group G3. In the zoom lens ZL3, the first lens group G1 having negative refractive power as a whole is composed of three lenses that are, in order from the object side, a negative meniscus lens L11 having a convex surface facing the object side, a double concave negative lens L12, and a positive meniscus lens L13 having a convex surface facing the object side. A front lens group G2F in the second lens group G2 having positive refractive power as a whole is composed of two lenses that are a cemented lens constructed by, in order from the object side, a negative meniscus lens L21 having a convex surface facing the object side cemented with a positive meniscus lens L22 having a convex surface facing the object side. A rear lens group G2R in the second lens group G2 having positive refractive power as a whole is composed of, in order from the object side, an aperture stop S, and three lenses that are a positive meniscus lens L23 having a convex surface facing the object side, and a cemented lens constructed by a negative meniscus lens L24 having a concave surface facing the image side cemented with a double convex positive lens L25. The third lens group G3 is composed of one lens that is a negative meniscus lens L31 having a concave surface facing the image side.

Various values associated with the zoom lens ZL3 according to Example 3 are listed in Table 3.

In Example 3, the distance d1 along the optical axis between the first lens group G1 and the front lens group G2F in the second lens group G2, the distance d2 along the optical axis between the front lens group G2F and the rear lens group G2R in the second lens group G2, and the distance d3 along the optical axis between the rear lens group G2R and the third lens group G3 are varied upon zooming. In [Variable Distances], variable distances in each focal length state, wide-angle end state (W), intermediate focal length state (M), and telephoto end state (T) with respect to shooting ranges of infinity and closest shooting range (d0=200 mm) are shown.

TABLE 3

[Specifications]

| | W | M | T |
|---|---|---|---|
| f = | 9.99 | 19.99 | 30.00 |
| Bf = | 0.5 | 0.5 | 0.5 |
| FNO = | 3.78 | 5.60 | 7.43 |
| 2ω= | 81.5° | 44.9° | 30.7° |
| IM = | 8.2 | 8.2 | 8.2 |

TABLE 3-continued

[Lens Data]

| i | r | d | νd | nd |
|---|---|---|---|---|
| *1 | 23.2800 | 1.3000 | 40.10 | 1.85135 |
| *2 | 8.7000 | 9.0142 | | |
| 3 | −114.6470 | 1.6647 | 53.20 | 1.69350 |
| 4 | 46.2589 | 0.1000 | | |
| 5 | 23.4802 | 3.4348 | 25.10 | 1.90200 |
| 6 | 86.7048 | (d1) | | |
| 7 | 11.1533 | 2.7000 | 46.62 | 1.81600 |
| 8 | 6.4045 | 2.7000 | 59.38 | 1.60729 |
| 9 | 22.2070 | (d2) | | |
| 10 | 0.0000 | 0.7015 | Aperture Stop S | |
| *11 | 10.9429 | 2.6859 | 62.56 | 1.55880 |
| 12 | 13.6285 | 1.0895 | | |
| 13 | 85.4236 | 2.7000 | 34.97 | 1.80100 |
| 14 | 10.0059 | 2.4961 | 65.44 | 1.60300 |
| 15 | −19.9649 | (d3) | | |
| 16 | 23.2917 | 2.0000 | 70.23 | 1.48749 |
| 17 | 21.6426 | 3.0000 | | |
| 18 | 0.0000 | 3.0000 | 64.10 | 1.51680 |
| 19 | 0.0000 | (Bf) | | |

[Lens Group Data]

| Group | I | focal length |
|---|---|---|
| G1 | 1 | −20.9469 |
| G2F | 7 | 45.9257 |
| G2R | 10 | 32.4183 |
| G2 | 7 | 23.1092 |
| G3 | 16 | −1040.6836 |

[Aspherical Surface Data]

Surface Number: 1

κ = 1.6705
C4 = −1.43850E−05
C6 = −3.39680E−07
C8 = 1.40850E−09
C10 = −2.46260E−12

Surface Number: 2

κ = 0.0075
C4 = 1.01880E−04
C6 = −2.22740E−07
C8 = −3.13580E−09
C10 = 2.40200E−11

Surface Number: 11

κ = 0.3018
C4 = −3.10000E−05
C6 = 9.39260E−07
C8 = −2.19100E−08
C10 = 7.01870E−10

[Variable Distances]

| | W | M | T |
|---|---|---|---|
| | Infinity | | |
| f | 9.99 | 19.99 | 30.00 |
| d1 | 32.5814 | 8.8953 | 1.0000 |
| d2 | 3.0000 | 3.0000 | 3.0000 |
| d3 | 15.5729 | 26.8640 | 38.1671 |
| TL | 90.2409 | 77.8460 | 81.2537 |
| Bf | 0.5001 | 0.5001 | 0.5001 |
| ACTL | 89.2187 | 76.8238 | 80.2316 |
| ACBf | 5.4779 | 5.4779 | 5.4779 |
| | Closest Shooting Range | | |
| β | −0.0445 | −0.0913 | −0.1383 |
| d1 | 34.7958 | 10.9623 | 3.2946 |
| d2 | 0.7856 | 0.9331 | 0.7054 |
| d3 | 15.5729 | 26.8640 | 38.1671 |
| TL | 90.2409 | 77.8460 | 81.2537 |
| Bf | 0.5001 | 0.5001 | 0.5001 |
| ACTL | 89.2187 | 76.8238 | 80.2316 |
| ACBf | 5.4779 | 5.4779 | 5.4779 |

[Values for Conditional Expressions]

(1) D2F/D2R = 0.6019
(2) IM × Z/TLM = 0.2729
(3) f2R/f2F = 0.4833
(4) RF = 9.4188
(5) D2/fw = 1.8091
(6) f2F/f2 = 2.5964

Figure 8A:
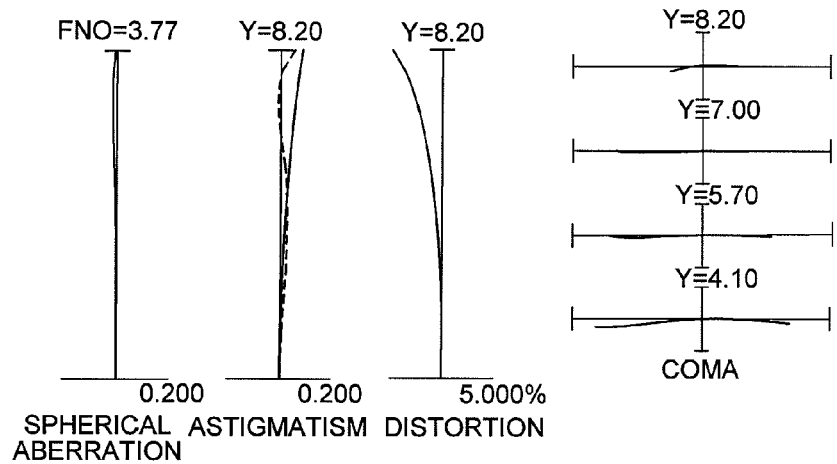
Figure 8B:
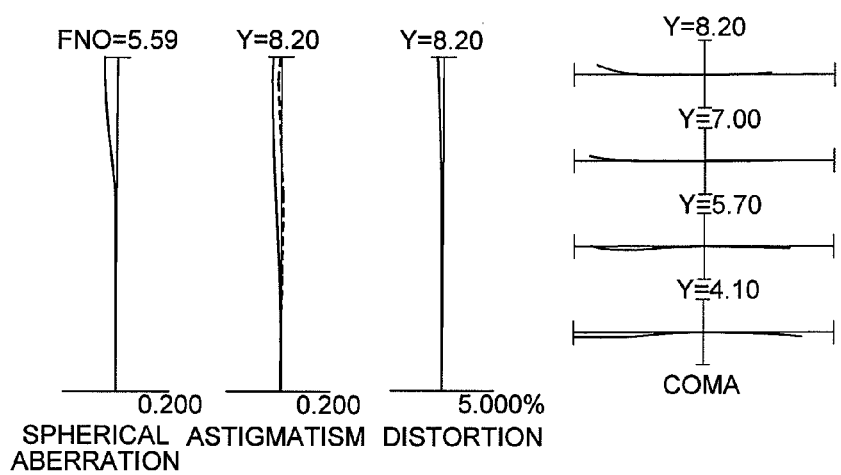
Figure 8C:
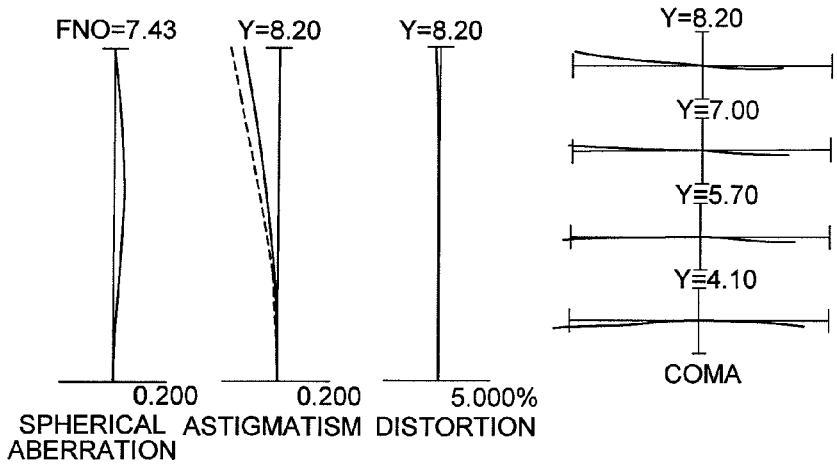
Figure 9A:
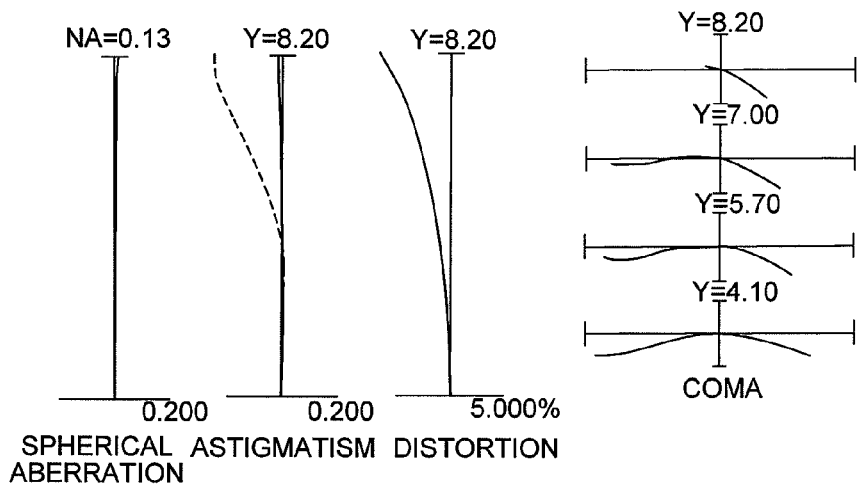
Figure 9B:
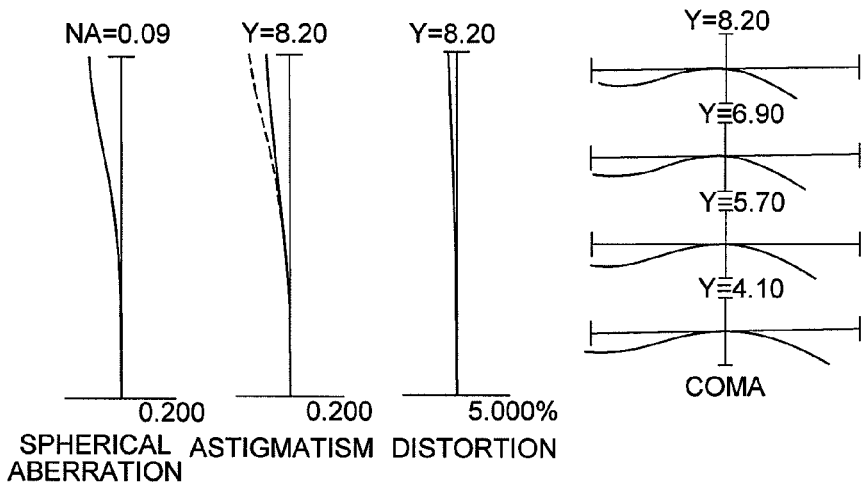
Figure 9C:
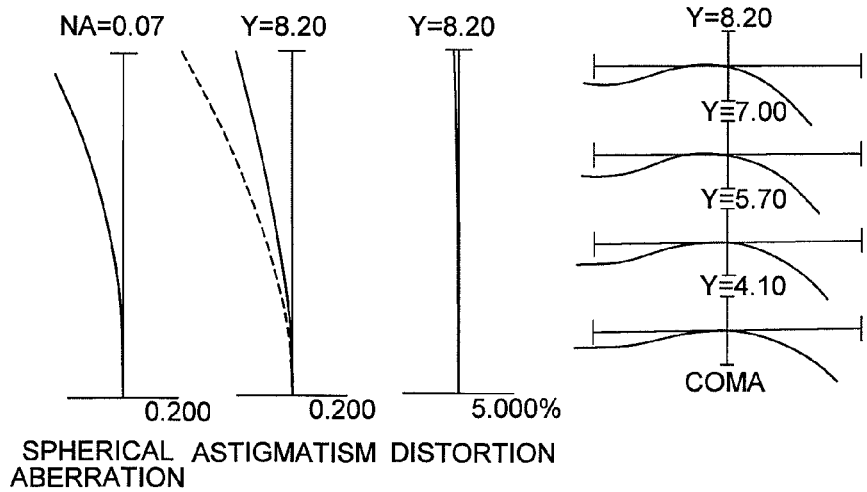

FIGS. 8A, 8B and 8C are graphs showing various aberrations of the zoom lens according to Example 3 at d-line (wavelength λ=587.6 nm) focusing on infinity, in which FIG. 8A shows various aberrations in a wide-angle end state, FIG. 8B shows various aberrations in an intermediate focal length state, and FIG. 8C shows various aberrations in a telephoto end state. FIGS. 9A, 9B and 9C are graphs showing various aberrations focusing on a closest shooting distance, in which FIG. 9A shows various aberrations in the wide-angle end state, FIG. 9B shows various aberrations in the intermediate focal length state, and FIG. 9C shows various aberrations in the telephoto end state.

As is apparent from the respective graphs, the zoom lens according to Example 3 shows superb optical performance as a result of good corrections to various aberrations from the wide-angle end state through the telephoto end state.

Example 4

Figure 10:
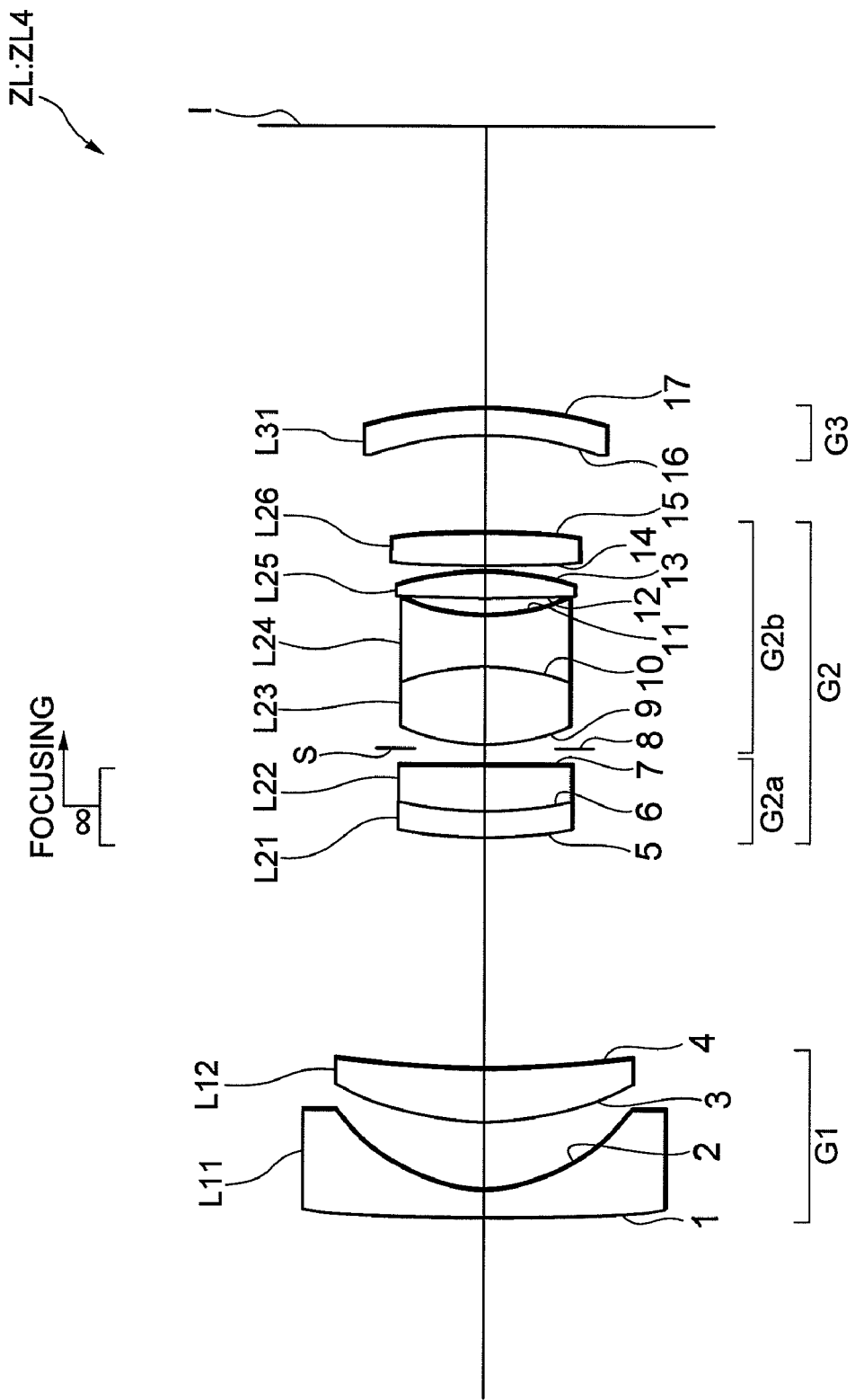
FIG. 10 is a sectional view showing a lens configuration of a zoom lens according to Example 4.

FIG. 10 is a sectional view showing a lens configuration of a zoom lens ZL4 according to Example 4. The zoom lens ZL4 according to Example 4 shown in FIG. 10 is composed of a first lens group G1, a second lens group G2, and the third lens group G3. In the zoom lens ZL4, the first lens group G1 having negative refractive power as a whole is composed of two lenses that are, in order from an object side, a negative meniscus lens L11 having a concave surface facing the image side, and a positive meniscus lens L12 having a convex surface facing the object side. A front lens group G2F in the second lens group G2 having positive refractive power as a whole is composed of two lenses that are, in order from the object side, a cemented lens constructed by a negative meniscus lens L21 having a convex surface facing the object side cemented with a positive meniscus lens L22 having a convex surface facing the object side. A rear lens group G2R in the second lens group G2 having positive refractive power as a whole is composed of, in order from the object side, an aperture stop S, and four lenses that are a cemented lens constructed by a double convex positive lens L23 cemented with a double concave negative lens L24, a positive meniscus lens L25 having a convex surface facing the object side, and a double convex positive lens L26. The third lens group G3 is composed of a negative meniscus lens L31 having a convex surface facing the image side.

Various values associated with the zoom lens ZL4 according to Example 4 are shown in Table 4. In the zoom lens ZL4 according to Example 4, a distance d1 along the optical axis between the first lens group G1 and the front lens group G2F in the second lens group G2, a distance d2 along the optical axis between the front lens group G2F and the rear lens group G2R in the second lens group G2, and a distance d3 along the optical axis between the rear lens group G2R and the third lens group G3 are varied upon zooming. In [Variable Distances], variable distances in each focal length state, wide-angle end state (W), intermediate focal length state (M), and telephoto end state (T) with respect to shooting ranges of infinity and closest shooting range (d0=459 mm) are shown.

TABLE 4

[Specifications]

| | W | M | T |
|---|---|---|---|
| f = | 9.44 | 12.96 | 18.13 |
| Bf = | 10.59 | 17.77 | 17.56 |
| FNO = | 3.99 | 4.72 | 5.59 |
| 2ω= | 77.1° | 58.5° | 42.8° |
| IM = | 8.2 | 8.2 | 8.2 |

[Lens Data]

| i | r | d | νd | nd |
|---|---|---|---|---|
| *1 | 104.1787 | 1.0000 | 40.19 | 1.85049 |
| *2 | 5.3165 | 2.5731 | | |
| 3 | 11.0612 | 2.0000 | 23.78 | 1.84666 |
| 4 | 36.5497 | (d1) | | |
| 5 | 17.0544 | 1.0000 | 35.31 | 1.59270 |
| 6 | 13.9075 | 1.7000 | 52.32 | 1.75500 |
| 7 | 273.4983 | (d2) | | |
| 8 | 0.0000 | 0.1000 | Aperture Stop S | |
| 9 | 7.6462 | 2.9795 | 45.87 | 1.54814 |
| 10 | −7.9955 | 1.9000 | 31.62 | 1.75692 |
| 11 | 7.9335 | 0.6500 | | |
| 12 | 87.1421 | 1.0049 | 67.87 | 1.59319 |
| 13 | −9.8241 | 0.2590 | | |
| 14 | 69.2280 | 1.2000 | 67.87 | 1.59319 |
| 15 | −30.0898 | (d3) | | |
| 16 | −12.2369 | 1.0000 | 60.03 | 1.64000 |
| 17 | −15.2548 | (Bf) | | |

[Lens Group Data]

| Group | I | focal length |
|---|---|---|
| G1 | 1 | −12.7650 |
| G2F | 7 | 22.9400 |
| G2R | 10 | 19.4250 |
| G2 | 7 | 11.8655 |
| G3 | 16 | −111.0000 |

[Aspherical Surface Data]

Surface Number: 1

κ = 1.0000
C4 = 2.04520E−05
C6 = −1.50310E−08
C8 = −1.16940E−08
C10 = 2.12500E−10

Surface Number: 2

κ = 0.4921
C4 = −9.85910E−05
C6 = −1.94350E−06
C8 = −2.42600E−07
C10 = 4.78370E−09

[Variable Distances]

| | W | M | T |
|---|---|---|---|

Infinity

| | | | |
|---|---|---|---|
| f | 9.44 | 12.95 | 18.13 |
| d1 | 8.6610 | 4.5056 | 0.5063 |
| d2 | 0.6787 | 0.6787 | 0.6787 |
| d3 | 3.7139 | 0.6895 | 4.9025 |
| TL | 41.0096 | 41.0096 | 41.0096 |
| Bf | 10.5896 | 17.7695 | 17.5558 |
| ACTL | 41.0096 | 41.0096 | 41.0096 |
| ACBf | 10.5896 | 17.7695 | 17.5558 |

TABLE 4-continued

Closest Shooting Range

| | | | |
|---|---|---|---|
| β | −0.0200 | −0.0275 | −0.0386 |
| d1 | 9.0185 | 4.8517 | 0.8635 |
| d2 | 0.3213 | 0.3326 | 0.3214 |
| d3 | 3.7139 | 0.6895 | 4.9025 |
| TL | 41.0096 | 41.0096 | 41.0096 |
| Bf | 10.5896 | 17.7695 | 17.5558 |
| ACTL | 41.0096 | 41.0096 | 41.0096 |
| ACBf | 10.5896 | 17.7695 | 17.5558 |

[Values for Conditional Expressions]

(1) D2F/D2R = 0.3378
(2) IM × Z/TLM = 0.3280
(3) f2R/f2F = 0.8468
(4) RF = 10.2213
(5) D2/fw = 1.2159
(6) f2F/f2 = 1.9333

Figure 11A:
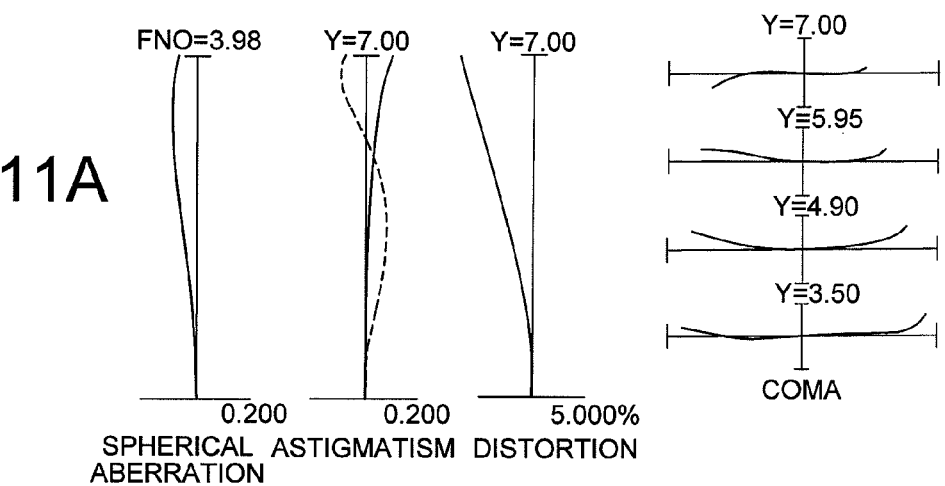
Figure 11B:
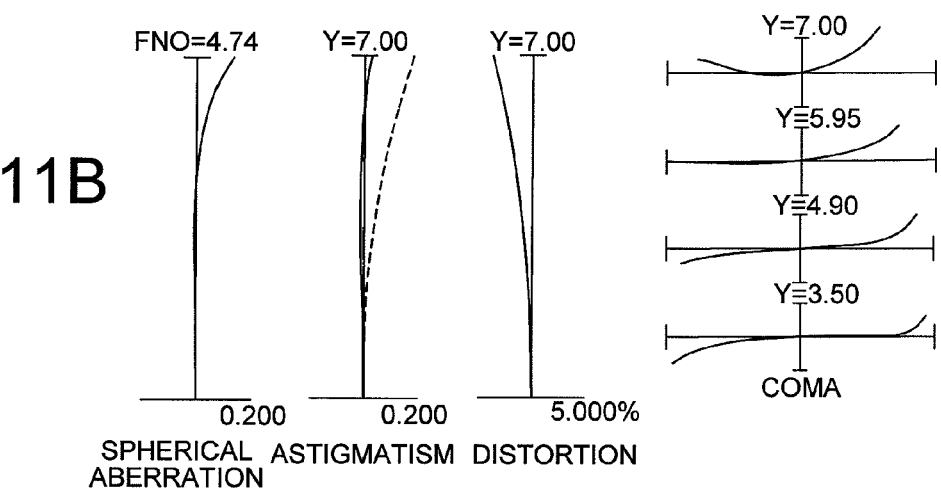
Figure 11C:
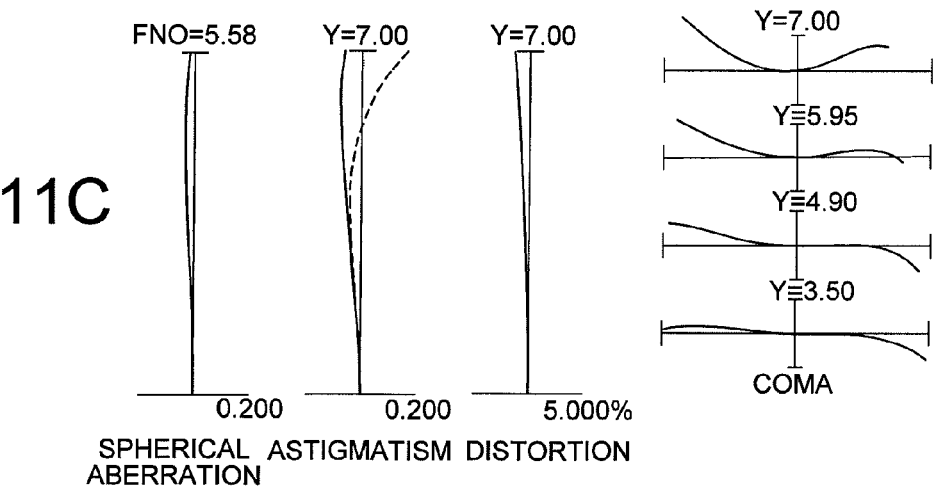
Figure 12A:
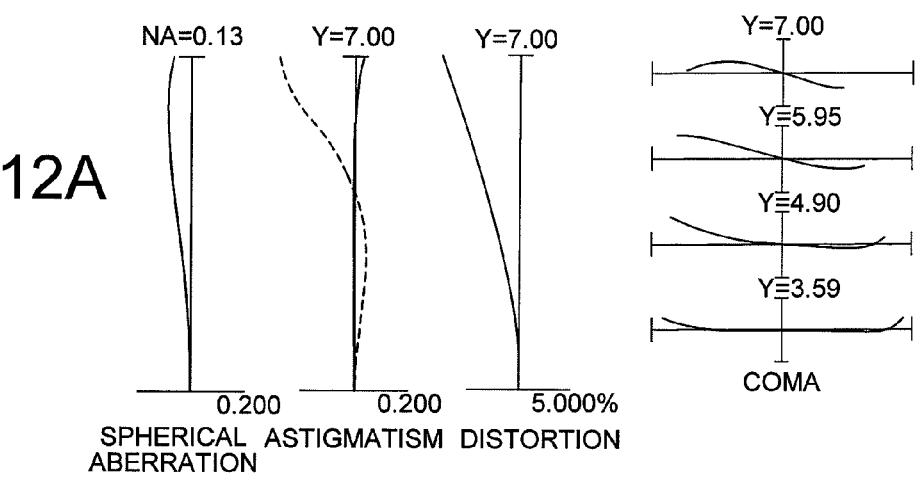
Figure 12B:
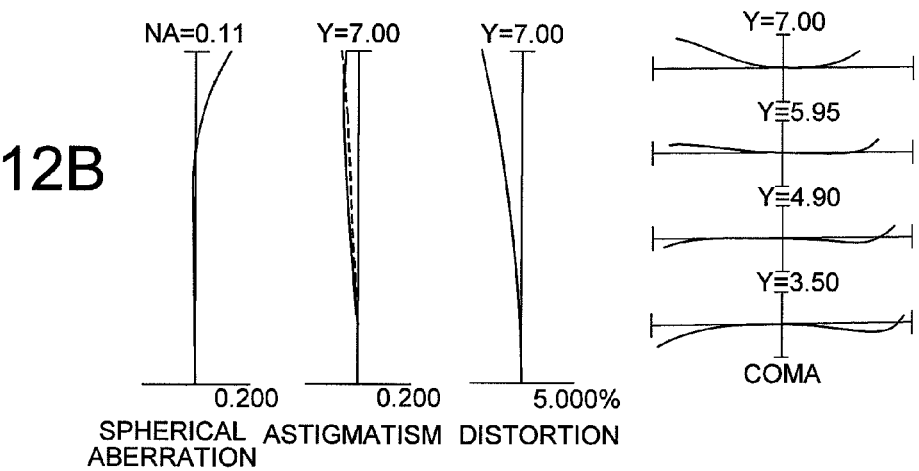
Figure 12C:
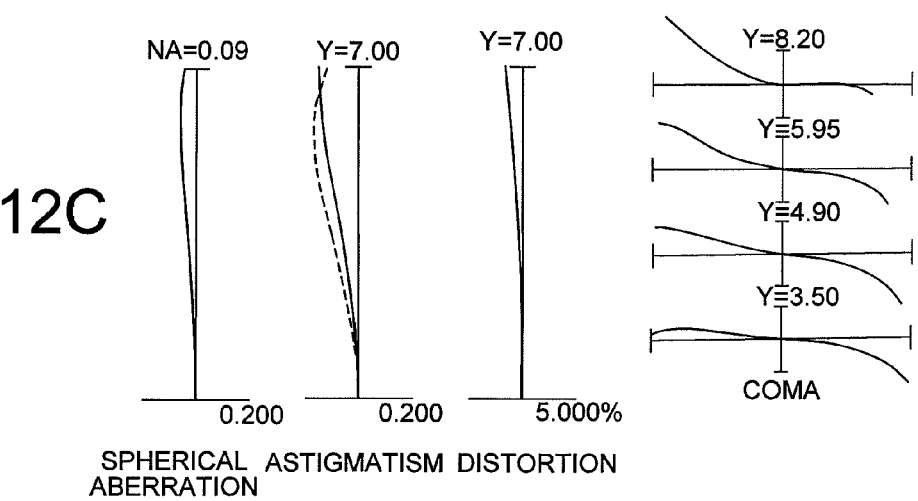

FIGS. 11A, 11B and 11C are graphs showing various aberrations of the zoom lens according to Example 4 at d-line (wavelength λ=587.6 nm) focusing on infinity, in which FIG. 11A shows various aberrations in a wide-angle end state, FIG. 11B shows various aberrations in an intermediate focal length state, and FIG. 11C shows various aberrations in a telephoto end state. FIGS. 12A, 12B and 12C are graphs showing various aberrations focusing on a closest shooting distance, in which FIG. 12A shows various aberrations in the wide-angle end state, FIG. 12B shows various aberrations in the intermediate focal length state, and FIG. 12C shows various aberrations in the telephoto end state.

As is apparent from the respective graphs, the zoom lens according to Example 4 shows superb optical performance as a result of good corrections to various aberrations from the wide-angle end state through the telephoto end state.

Incidentally, the following description may suitably be applied within limits that do not deteriorate optical performance.

Although a two-lens-group configuration or a three-lens-group configuration is shown in each Example of the present application, the present application can be applied to other lens-group configuration such as a four-lens-group configuration. Moreover, a lens configuration that a lens or a lens group is added to the object side, or a lens configuration that a lens or a lens group is added to the most image side may be possible. Incidentally, a lens group is defined as a portion having at least one lens that is separated by an air space that varies upon zooming.

In each Example, in order to vary focusing from infinity to a close distance, a portion of a lens group, a single lens group, or a plurality of lens groups may be moved along the optical axis as a focusing lens group. In this case, the focusing lens group can be used for auto focus, and suitable for being driven by a motor such as an ultrasonic motor. It is particularly preferable that at least a portion of the second lens group G2 is used as the focusing lens group.

A lens group or a portion of a lens group may be shifted in a direction having a component perpendicular to the optical axis, or tilted (fluctuated) in a plane including the optical axis as a vibration reduction lens group for correcting an image blur caused by a camera shake. It is particularly preferable that at least a portion of the second lens group G2 is used as a vibration reduction lens group.

Moreover, a lens surface may be formed as a spherical surface, a plane surface or an aspherical surface. When a lens surface is a spherical surface or a plane surface, processing and assembly is easy, so that deterioration of optical performance caused by errors upon processing and assembling can be prevented. Even if the lens surface is shifted, deterioration in optical performance is small, so that it is desirable. When the lens surface is an aspherical surface, the aspherical surface may be fabricated by a fine grinding process, a glass molding process in which a glass material is formed into an aspherical shape by a mold, or a compound type process in which a resin material is formed into an aspherical shape on a glass surface. Any lens surface may be a diffractive optical surface. Any lens may be a graded index lens (GRIN lens), or a plastic lens.

Although an aperture stop S is preferably disposed in the vicinity of the second lens group G2, the function may be substituted by a lens frame without disposing a member as an aperture stop S. It is much preferable that the aperture stop S is disposed between the front lens group G2F and the rear lens group G2R in the second lens group G2.

An antireflection coating having high transmittance over a broad wavelength range may be applied to each lens surface to reduce flare or ghost images, so that high optical performance with a high contrast can be attained.

In a zoom lens ZL according to the present embodiment, the first lens group G1 preferably includes one positive lens component and one negative lens component. The first lens group G1 preferably disposes lens components, in order from the object side, a negative lens component and a positive lens component with an air space in between. Or the first lens group G1 preferably includes one positive lens component and two negative lens components. The first lens group G1 preferably disposes lens components, in order from the object side, negative-negative-positive with disposing an air space in between.

In a zoom lens ZL according to the present embodiment, the second lens group G2 preferably includes two positive lens components. The second lens group G2 preferably disposes lens components, in order from the object side, a positive lens component and a positive lens component with disposing an air space in between. In a zoom lens ZL according to the present embodiment, the third lens group G3 preferably includes one negative lens component.

In a zoom lens ZL according to the present embodiment, a zoom ratio is about two to five. In a zoom lens ZL according to the present embodiment, a distance between the image side lens surface of the lens component disposed to the most image side lens and the image plane, which is a back focal length, is preferably about 10 to 30 mm. In a zoom lens ZL according to the present embodiment, the image height is preferably 5 to 12.5 mm, and much preferably 5 to 9.5 mm.

The present embodiment only shows a specific example for the purpose of better understanding of the present invention. Accordingly, it is needless to say that the invention in its broader aspect is not limited to the specific details and representative devices.

What is claimed is:

1. A zoom lens comprising, in order from an object side:
a first lens group having negative refractive power; and
a second lens group having positive refractive power;
a distance between the first lens group and the second lens group being variable upon zooming from a wide-angle end state to a telephoto end state,
the second lens group including a front lens group and a rear lens group,
the front lens group being movable along an optical axis upon focusing on a close object, and
the following conditional expression being satisfied:

$$0.20 < D2F/D2R < 0.65$$

where D2F denotes a distance along the optical axis between the most object side lens surface and the most image side lens surface of the front lens group, and D2R denotes a distance along the optical axis between the most object side lens surface and the most image side lens surface of the rear lens group.

2. The zoom lens according to claim 1, wherein the following conditional expression is satisfied:

$$0.20 < IM \times Z/TLM < 1.20$$

where IM denotes an image height, Z denotes a zoom ratio, and TLM denotes the maximum value of the total lens length during zooming from the wide-angle end state to the telephoto end state upon focusing on infinity.

3. The zoom lens according to claim 1, wherein the following conditional expression is satisfied:

$$0.70 < f2R/f2F < 1.00$$

where f2F denotes a focal length of the front lens group in the second lens group, and f2R denotes a focal length of the rear lens group in the second lens group.

4. The zoom lens according to claim 1, wherein the front lens group in the second lens group includes at least one cemented lens and at least one cemented surface of the cemented lens satisfies the following conditional expression:

$$0 < RF$$

where RF denotes a radius of curvature of the cemented surface.

5. The zoom lens according to claim 1, wherein the front lens group in the second lens group includes at least one cemented lens, and the at least one cemented lens is constructed by a negative lens disposed to the object side cemented with a positive lens disposed to the image side.

6. The zoom lens according to claim 1, wherein the following conditional expression is satisfied:

$$0.60 < D2/fw < 3.40$$

where D2 denotes a combined thickness of the second lens group, and fw denotes a focal length of the zoom lens in the wide-angle end state.

7. The zoom lens according to claim 1, wherein the following conditional expression is satisfied:

$$1.20 < f2F/f2 < 3.00$$

where f2F denotes a focal length of the front lens group in the second lens group, and f2 denotes a focal length of the second lens group.

8. The zoom lens according to claim 1, wherein the front lens group in the second lens group is composed of two lenses or less.

9. The zoom lens according to claim 1, wherein all lens components composing the second lens group are positive.

10. The zoom lens according to claim 1, wherein the rear lens group in the second lens group includes two cemented lens components.

11. The zoom lens according to claim 1, wherein the rear lens group in the second lens group includes at least one cemented lens component, and the cemented lens component located to the most object side has a positive lens disposed to the most object side.

12. The zoom lens according to claim 1, wherein the first lens group includes, in order from the object side, one or two single negative lenses and a single positive lens.

13. The zoom lens according to claim 1, wherein an aperture stop is disposed between the front lens group and the rear lens group in the second lens group.

14. The zoom lens according to claim 1, wherein at least one portion of the second lens group is movable in a direction including a component substantially perpendicular to the optical axis.

15. An optical apparatus equipped with the zoom lens according to claim 1.

16. A method for manufacturing a zoom lens that includes a first lens group having negative refractive power and a second lens group having positive refractive power, the method comprising steps of:
   providing the first lens group and the second lens group such that a distance between the first lens group and the second lens group is variable upon zooming from a wide-angle end state to a telephoto end state;
   Providing a front lens group and a rear lens group in the second lens group such that the front lens group is movable along the optical axis upon focusing on a close object; and
   satisfying the following conditional expression:

$$0.20 < D2F/D2R < 0.65$$

where D2F denotes a distance along an optical axis between the most object side lens surface and the most image side lens surface of the front lens group, and D2R denotes a distance along the optical axis between the most object side lens surface and the most image side lens surface of the rear lens group.

17. The method according to claim 16, further comprising a step of:
   satisfying the following conditional expression:

$$0.20 < IM \times Z/TLM < 1.20$$

where IM denotes an image height, Z denotes a zoom ratio, and TLM denotes the maximum value of the total lens length during zooming from the wide-angle end state to the telephoto end state upon focusing on infinity.

18. The method according to claim 16, further comprising a step of:
   satisfying the following conditional expression:

$$0.70 < f2R/f2F < 1.00$$

where f2F denotes a focal length of the front lens group in the second lens group, and f2R denotes a focal length of the rear lens group in the second lens group.

19. The method according to claim 16, further comprising a step of:
   satisfying the following conditional expression:

$$0.60 < D2/fw < 3.40$$

where D2 denotes a combined thickness of the second lens group, and fw denotes a focal length of the zoom lens in the wide-angle end state.

* * * * *